United States Patent
Wolynski et al.

(10) Patent No.: US 11,402,193 B2
(45) Date of Patent: Aug. 2, 2022

(54) METHOD AND SYSTEM FOR MEASURING DEFLECTIONS OF STRUCTURAL MEMBER AT MULTIPLE LOCATIONS USING MULTIPLE ANTENNAE

(71) Applicant: COLORADO STATE UNIVERSITY RESEARCH FOUNDATION, Fort Collins, CO (US)

(72) Inventors: Jakob Wolynski, Highlands Ranch, CO (US); Kevin M. Labus, Fort Collins, CO (US); Christian M. Puttlitz, Fort Collins, CO (US); Kirk C. McGilvray, Fort Collins, CO (US)

(73) Assignee: COLORADO STATE UNIVERSITY RESEARCH FOUNDATION, Fort Collins, CO (US)

( * ) Notice: Subject to any disclaimer, the term of this patent is extended or adjusted under 35 U.S.C. 154(b) by 40 days.

(21) Appl. No.: 17/146,112

(22) Filed: Jan. 11, 2021

(65) Prior Publication Data
US 2021/0131785 A1    May 6, 2021

Related U.S. Application Data

(63) Continuation-in-part of application No. 16/589,736, filed on Oct. 1, 2019, now Pat. No. 10,892,558.

(51) Int. Cl.
   *G01B 7/24*    (2006.01)
   *G01D 5/22*    (2006.01)

(52) U.S. Cl.
   CPC ............ *G01B 7/24* (2013.01); *G01D 5/2291* (2013.01)

(58) Field of Classification Search
   CPC .................................. G01B 7/24; G01D 5/2291
   See application file for complete search history.

(56) References Cited

U.S. PATENT DOCUMENTS 2,356,763 A   8/1944   Keinath
3,274,527 A   9/1966   Robinson
(Continued)

FOREIGN PATENT DOCUMENTS

WO   2005104945 A2   11/2005
WO   2009146090 A1   12/2009
(Continued)

OTHER PUBLICATIONS

International Search Report issued in Intl. Appln. No. PCT/US2019/025054 dated Jun. 10, 2019.
Written Opinion issued in Intl. Appln. No. PCT/US2019/025054 dated Jun. 10, 2019.
Rho et al. "Young's Modulus of Trabecular and Cortical Bone Material: Ultrasonic and Microtensile Measurements." Journal of Biomechanics. 1993: 111-119. vol. 26, No. 2. Cited in Specification.
(Continued)

*Primary Examiner* — Andrea Lindgren Baltzell
(74) *Attorney, Agent, or Firm* — Rossi, Kimms & McDowell LLP

(57) ABSTRACT

Multiple deflections of a structural member (SM) can be measured at multiple locations thereof, which deflections can be used to monitor changes in stiffness over time, using at least one antenna to measure the resonant frequencies at different harmonic frequency numbers of a predetermined radio frequency spectrum. One antenna can include a plurality of coils providing a first coil region that has a maximum sensitive to a first resonant frequency harmonic number and another antenna can include a plurality of coils providing a second coil region that has a maximum sensitivity to a second resonant frequency harmonic number that is different from the first predetermined resonant frequency harmonic number. Using different harmonic resonant frequency numbers, deflections at multiple regions of the SM can be determined concurrently using a plurality of antennae.

26 Claims, 24 Drawing Sheets

(56) References Cited

U.S. PATENT DOCUMENTS

| | | | |
|---|---|---|---|
| 3,324,714 | A | 6/1967 | Simon et al. |
| 5,339,533 | A | 8/1994 | Richardson |
| 5,804,738 | A | 9/1998 | Bach et al. |
| 6,053,052 | A | 4/2000 | Starostovic |
| 7,581,446 | B2 | 9/2009 | Troxler |
| 8,278,941 | B2 | 10/2012 | Kroh |
| 8,971,024 | B1 | 3/2015 | Tom et al. |
| 9,326,728 | B2 | 5/2016 | Demir et al. |
| 9,662,066 | B2 | 5/2017 | Ledet |
| 10,641,664 | B2 | 5/2020 | Puttlitz et al. |
| 10,674,954 | B2 | 6/2020 | Puttlitz |
| 2004/0139801 | A1 | 7/2004 | Wilk |
| 2006/0244580 | A1 | 11/2006 | Nordmeyer |
| 2007/0119266 | A1 | 5/2007 | Kain |
| 2007/0186677 | A1 | 8/2007 | Zunino, III et al. |
| 2010/0044574 | A1 | 2/2010 | Nishino et al. |
| 2010/0201378 | A1 | 8/2010 | Costanzo et al. |
| 2010/0213929 | A1 | 8/2010 | Gregg |
| 2011/0152725 | A1 | 6/2011 | Demir et al. |
| 2012/0126833 | A1 | 5/2012 | Dooley |
| 2012/0154248 | A1 | 6/2012 | Haque et al. |
| 2013/0120003 | A1 | 5/2013 | Sheikman |
| 2014/0084909 | A1 | 3/2014 | Pagani |
| 2014/0182388 | A1 | 7/2014 | Sipila et al. |
| 2016/0282504 | A1 | 9/2016 | Wilson et al. |
| 2019/0038214 | A1 | 2/2019 | Mikhail |

FOREIGN PATENT DOCUMENTS

| | | |
|---|---|---|
| WO | 2013119528 A1 | 8/2013 |
| WO | 2018195437 A1 | 10/2018 |

OTHER PUBLICATIONS

Stein et al. "The Human Tibia A Simplified Method of Radiographic Analysis of its Cross-Section, With Anthropometric Correlations." Annals of Biomedical Engineering. 1979: 103-116. vol. 7. Cited in Specification.

International Search Report issued in Intl. Appln. No. PCT/US2018/028590 dated Jul. 5, 2018.

Written Opinion issued in Intl. Appln. No. PCT/US2018/028590 dated Jul. 5, 2018.

Muchaidze. "Installation and performance evaluation of coaxial cable sensors for crack and corrosion detection." Masters Theses. 2011: 95 pages.

Office Action issued in U.S. Appl. No. 16/262,305 dated Jun. 28, 2019.

Office Action issued in U.S. Appl. No. 16/460,249 dated Aug. 30, 2019.

Keysight Technologies. "Network Analyzer Basics." Training Manual. Jul. 31, 2014: 1-94. (Year: 2014).

Megson, T.H.G. "Structural and Stress Analysis" (2nd Edition) Ch 16. 2005: 467-547. Web. Aug. 27, 2019. Elsevier. <https://app.knovel.com/hotlink/toc/id:kpSSAE0005/structural-stress-analysis/structural-stress-analysis>.

Notice of Allowance issued in U.S. Appl. No. 16/262,305 dated Dec. 16, 2019.

Office Action issued in U.S. Appl. No. 16/460,249 dated Dec. 23, 2019.

Notice of Allowance issued in U.S. Appl. No. 16/460,249 dated Feb. 5, 2020.

Copending U.S. Appl. No. 17/039,111, filed Sep. 30, 2020.

Extended European Search Report issued in European Appln. No. 18787095.1 dated Dec. 10, 2020.

Notice of Allowance issued in U.S. Appl. No. 16/589,736 dated Sep. 4, 2020.

Example curve showing antenna resonant frequency relative to the applied load.

Radiographs of the eight testing conditions of the sheep tibia showing progressively destabilizing osteotomies Schematic illustration of an antenna for detecting SM deflections in multiple discrete locations

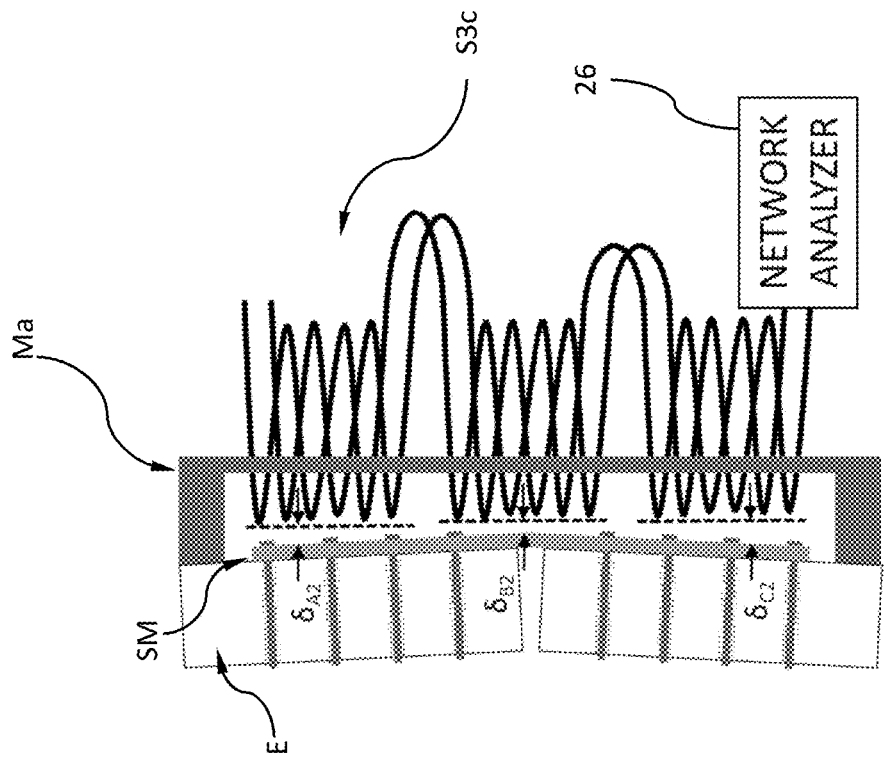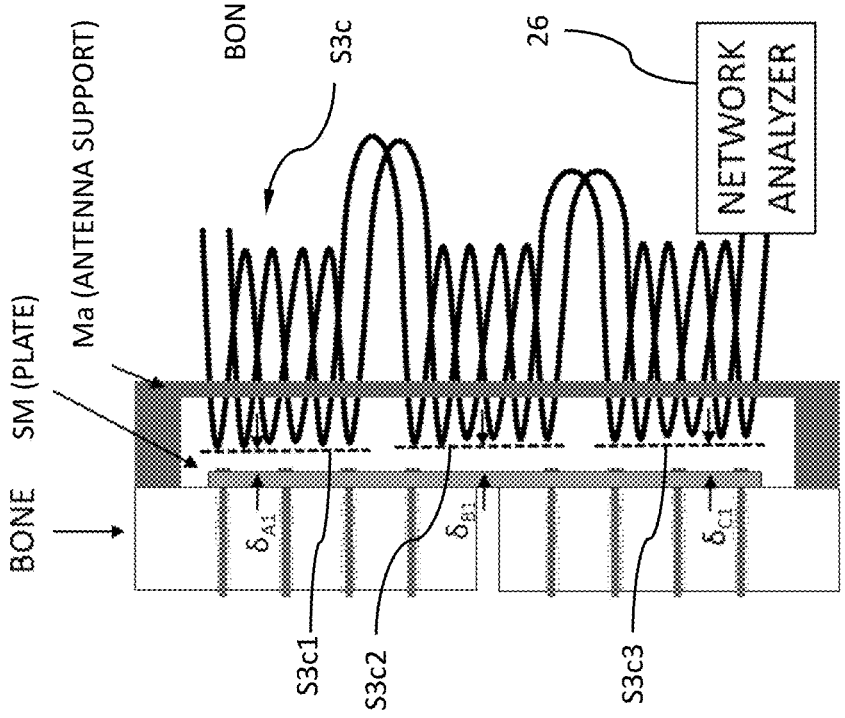
Schematic illustration of measuring deflection of a single SM at multiple locations using a single antenna

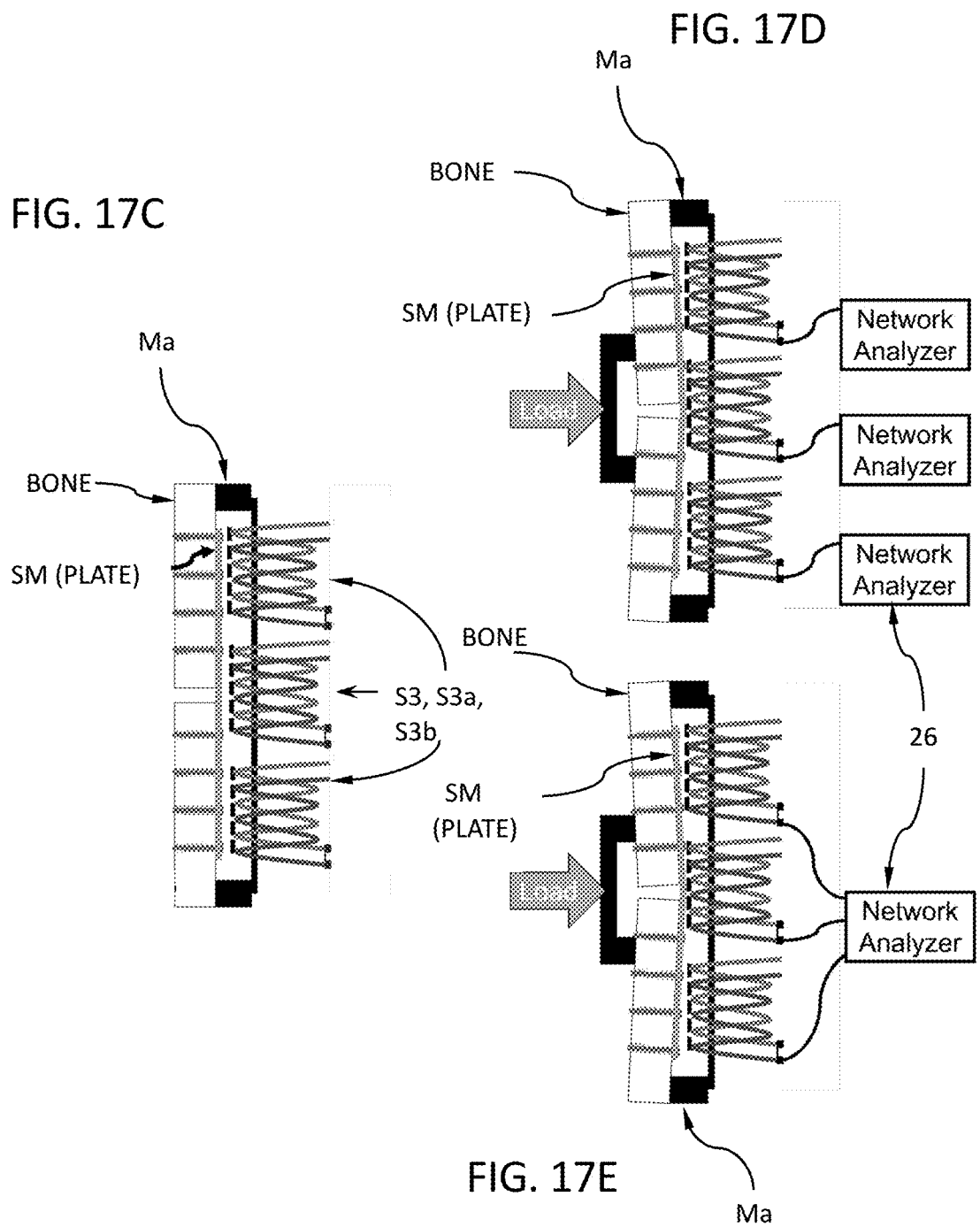
Schematic illustrations of three discrete antennae at multiple locations using one or three network analyzers Plots representing the relative sensitivity to SM deflection based upon antenna location and resonant frequency harmonic numbers.

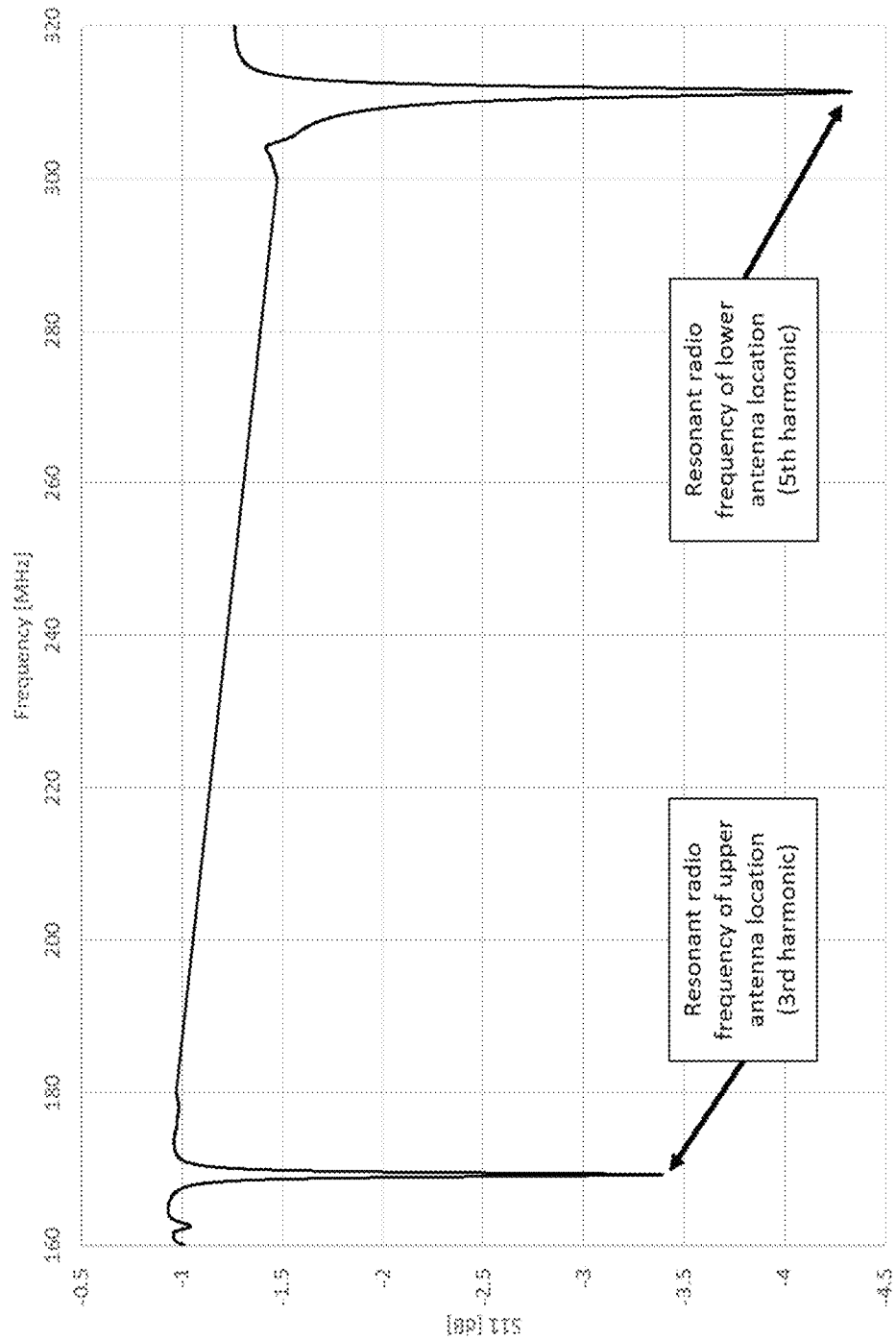

Quantity of resonant radio frequency shift due to the displacement of SM from contacting a discrete location of the antenna

METHOD AND SYSTEM FOR MEASURING DEFLECTIONS OF STRUCTURAL MEMBER AT MULTIPLE LOCATIONS USING MULTIPLE ANTENNAE This application is a continuation-in-part of application Ser. No. 16/589,736 filed 1 Oct. 2019, to be issued as U.S. Pat. No. 10,892,558.

BACKGROUND

The disclosures of U.S. Pat. Nos. 10,674,954 and 10,641,664 are both incorporated by reference herein in their entirety. In particular, these patents disclose that an in-dwelling strain sensor is not needed to monitor strain applied to a structural member. Instead, these patents disclose using an antenna spaced from a structural member without the antenna making contact therewith. The '954 patent discloses a loading device that applies loading a structural member (SM) in relation the antenna held spaced at a fixed distance from the SM.

But there still remains a need for a methodology and a device/system for measuring deflections of the SM at multiple locations concurrently, which deflections can be used to measure the stiffness of the SM at multiple locations thereof. The present invention addresses this need.

SUMMARY

One aspect of the present invention is an apparatus for measuring deflections in a structural member (SM) at multiple locations as the SM undergoes a displacement as a load is applied to the SM. The SM can be mounted to a target object to be monitored, the SM undergoing the displacement as the target structural object undergoes a displacement or deformation.

The apparatus includes a plurality of antennae, including a first antenna and a second antenna, and a support or support structure, such as a frame. Each of the plurality of antennae includes a plurality of coils. The first antenna includes a first coil region configured to provide a maximum sensitivity to a first resonant frequency harmonic number within a predetermined radio frequency spectrum. The second antenna includes a second coil region configured to provide a maximum sensitivity to a second resonant frequency harmonic number, which is different from the first resonant frequency harmonic number, within the predetermined radio frequency spectrum.

Each antenna is configured to induce, upon applying a first electrical signal thereto, a magnetic or electromagnetic field in the SM and create a coupling of the magnetic or electromagnetic field between the respective antenna and the SM. In particular, the characteristics of the magnetic or electromagnetic field coupling between (a) the first antenna and the SM are associated with a distance between a first predetermined region of the SM and the first coil region and (b) the second antenna and the SM are associated with a distance between a second predetermined region of the SM and the second coil region. Each antenna outputs a second electrical signal representing the characteristics of the magnetic or electromagnetic field coupling between the respective antenna and the SM. Each of the second electrical signals contains information for determining a respective deflection at a respective predetermined region of the SM for each of the plurality of antennae.

The support structure can maintain the first coil region disposed confronting the first predetermined region of the SM to be measured at a first distance from the SM and the second coil region disposed confronting the second predetermined region of the SM to be measured, which is different from the first predetermined region, at a second distance from the SM. The first distance can be equal to or different from the second distance, and vice versa.

Each antenna can be a dipole antenna that operates as a displacement sensor and comprises a first coaxial cable including a first end and a second end. The first end of the first coaxial cable receives the first electrical signal, and the first end of the first coaxial cable outputs the second electrical signal.

The dipole antenna can further include a second coaxial cable including a third end and a fourth end. The first coaxial cable includes a first shield and a first center conductor. The second coaxial cable includes a second shield and a second center conductor. The first and second shields are electrically connected. The first center conductor at the second end and the second center conductor at the third and fourth ends can terminate without any connection. A predetermined length of the first center conductor is exposed at the second end and a predetermined length of the second center conductor is exposed at the fourth end. The support structure maintains the exposed first and second conductors substantially parallel to each other.

The plurality of coils of each antenna include a plurality of first coils of the first coaxial cable and a plurality of second coils of the second coaxial cable. The support structure maintains the plurality of first coils in a coiled configuration between the first end and the second end and the plurality of second coils in a coiled configuration between the third end and the fourth end.

Another aspect of the present invention is a monitoring system for monitoring changes in the SM at multiple locations as the SM undergoes a displacement as a load is applied to the SM.

The system includes the plurality of antennae and the support structure described above, and a load applying mechanism that can apply a load to the SM. Each antenna can output the second electrical signal each time the load applying mechanism applies the load to the SM. Again, the second electrical signals contain information for determining respective deflections at respective predetermined regions of the SM.

The system further includes a controller and at least one hardware interface. The controller includes a memory storing instructions and a processor configured to implement instructions stored in the memory and execute a plurality of tasks. The at least one hardware interface is configured to receive the second electrical signal from each antenna, and convert the second signal that is readable by the controller. The plurality of tasks include a first determining task and a storing task. The first determining task, based on the converted second electrical signals of the first and second antennae from the at least one hardware interface, determines the characteristics of the magnetic or electromagnetic field coupling between the first and second antenna and the SM respectively at the predetermined regions of the SM, and determines the deflections at the predetermined regions of the SM. The storing task stores the determined deflections in the storage device each time the load applying mechanism applies a load to the SM. The applied load values also can be stored concurrently or prestored.

The at least one hardware interface can be a network analyzer provided with a plurality of ports or a plurality of network analyzers. The at least one network analyzer or the plurality of network analyzers each are configured to output the first electrical signal to each antenna, receive the second electrical signal from each antenna, and also determine the characteristics of the magnetic or electromagnetic field coupling between each antenna and the SM based on the received respective second electrical signal.

The first determining task determines the deflections at the first and second predetermined regions of the SM at a predetermined interval for an evaluation period and the storing task stores the determined deflections at the predetermined interval for the evaluation period.

The plurality of tasks can include a second determining task that determines a shift in characteristics of the magnetic or electromagnetic field coupling between each antenna and the SM over the evaluation period.

The plurality of tasks can include a third determining task that determines a temporal change in relative displacement of the SM at the predetermined regions of the SM over the evaluation period based on the shift determined in the second determining task. The temporal change in relative displacement of the SM at the predetermined regions over the evaluation period can be represented as a slope of resonant frequency/load at the respective first and second resonant frequency harmonic numbers within the predetermined radio frequency spectrum.

The load applying mechanism can apply a predetermined load to the SM, and the first determining task analyzes the determined characteristics in relation to the predetermined load applied to the SM by the load applying mechanism to determine the deflections at the predetermined regions of the SM.

Another aspect of the present invention is a method of monitoring changes in the SM at multiple locations as the SM undergoes a displacement as a load is applied to the SM. The method comprises an antennae providing step of providing the plurality of antennae described above, an antennae disposing step, an inducing step, an outputting step, a first determining step, and a storing step.

The antennae disposing step disposes the first coil region confronting the first predetermined region of the SM to be monitored at the first distance from the SM and the second coil region disposed confronting the second predetermined region of the SM to be monitored, which is different from the first predetermined region, at the second distance from the SM.

The inducing step induces, by applying the first electrical signal to each antenna, the magnetic or electromagnetic field in the SM and creates the coupling of the magnetic or electromagnetic field between each antenna and the SM. The characteristics of the magnetic or electromagnetic field coupling between the respective antenna and the SM are associated with a distance between a respective predetermined region of the SM as previously described.

The outputting step outputs, by each antenna, the second electrical signal representing the characteristics of the magnetic or electromagnetic field coupling between the respective antenna and the SM. The first determining step determines, based on the obtained second electrical signal of the respective antenna, the respective deflection at the respective predetermined region of the SM. The storing step stores the determined deflections at the first and second predetermined regions of the SM in the storage device. The outputting step outputs the second electrical signal from each of the plurality of antenna to at least one network analyzer provided with a plurality of ports or a plurality of network analyzers.

The method further can further include a repeating step of repeating the inducing step, the outputting step, the first determining step, and the storing step at the predetermined interval for the evaluation period.

The method can further include a second determining step of determining a shift in characteristics of the magnetic or electromagnetic field coupling between each antenna and the SM over the evaluation period. The method can further include a third determining step of determining a temporal change in relative displacement of the SM at the predetermined regions of the SM over the evaluation period based on the shift determined in the second determining step.

The method can further include a loading step of applying a predetermined load to the SM, and the first determining step analyzes the determined characteristics in relation to the predetermined load applied to the SM in the loading step to determine the deflections at the first and second predetermined regions of the SM.

BRIEF DESCRIPTION OF THE DRAWING

FIGS. 17A-17B schematically illustrate measuring deflection of a single SM at multiple (three) locations using a single antenna.

FIGS. 17C-17E schematically illustrate measuring deflection of a single SM at multiple (three) locations using multiple (three) antennae.

FIG. 21 is a plot of the radio frequency spectrum for the antenna of FIG. 20 where concurrent measurements were made at two locations, demonstrating the resonant radio frequencies of each harmonic shifting independently when a SM is displaced in the individual vicinities thereof.

DETAILED DESCRIPTION

The present loading device and monitoring system can measure the deflection of a structural member (SM) that deflects when a force is applied, and thus measure the stiffness of the SM over time.

Figure 1:
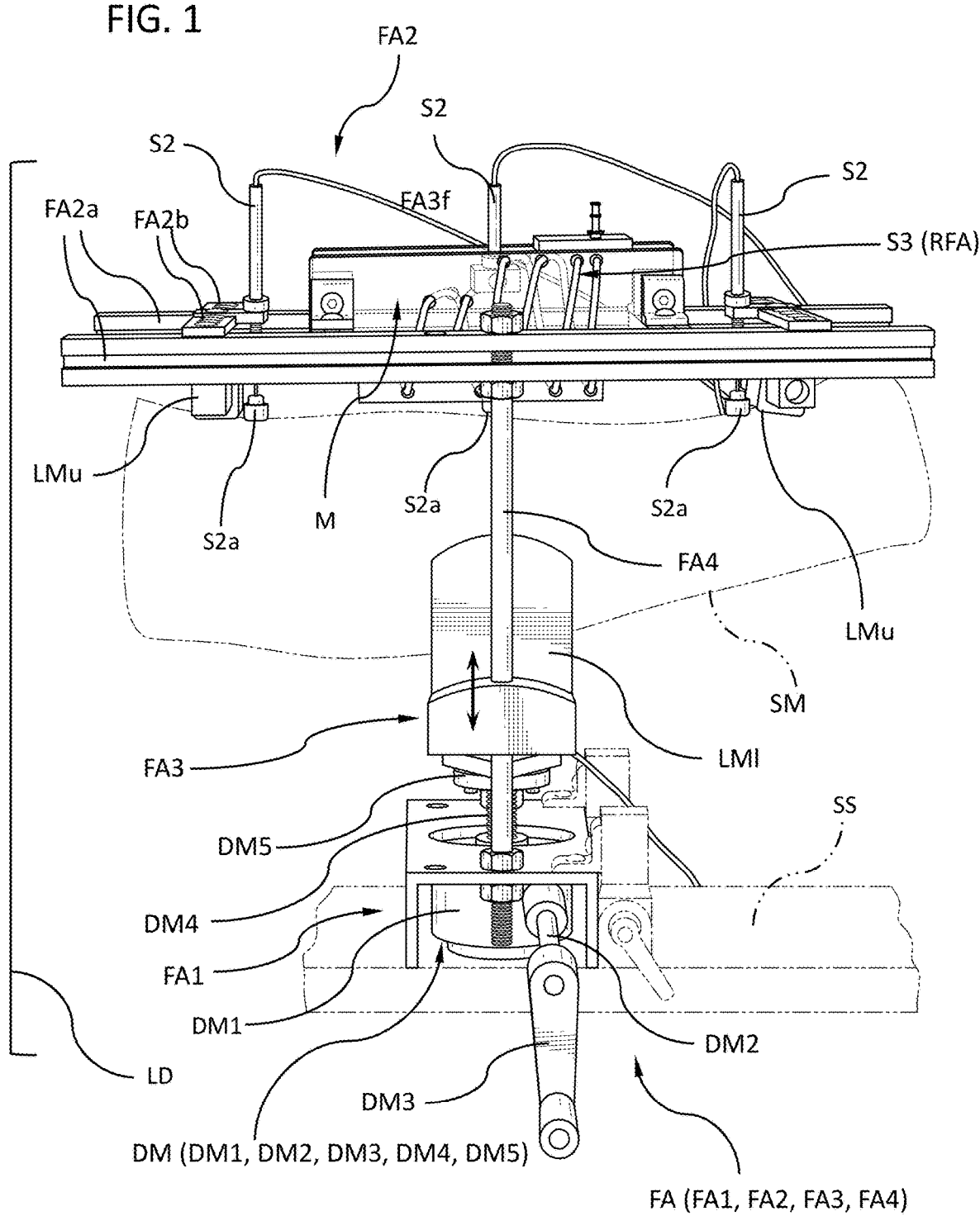
FIG. 1 illustrates an overall side perspective view of a loading device according to the present invention, with a structural member shown in phantom.

Referring to FIG. 1, the loading device LD includes a loading frame assembly FA, a driving (applying) mechanism DM, a (first) sensor S1, a plurality of (second) sensors S2, and a (third) sensor 3. The frame assembly FA can rest on a stable surface SS, such as a sturdy table or a floor, and include upper and lower loading members LMu, LMl that act as loading points on two sides of the SM, such as a fractured tibia fixed with an intramedullary nail or other structure support, in multiple-point bending configuration, such as a three-point bending (shown in FIG. 1) or four-point bending configuration (shown in FIG. 6). The locations of the loading points can be adjustable to accommodate various lengths of the SM. The loading members, including multiple upper (first) loading members LMu, that are positioned spaced from each other at a desired distance and rigidly mounted to the frame assembly FA, and at least one lower (second) loading member LMl, which is driven toward or away (see the double arrows in FIG. 1) from the upper loading members LMu using the driving mechanism DM secured to the frame assembly FA.

The driving mechanism DM can be a linear screw jack, which can be manually controlled by a hand crank DM3 connected to a rotating shaft DM2. The sensor S1, which can be a load sensor, such as a load cell, can be connected to a movable support or bed FA3 to measure the force applied by the driving mechanism DM.

The loading device LD in the present development uses two different types of sensors, namely a first type that makes a physical contact with the SM and/or material surrounding the SM, such as skin and tissue, and a second type that makes no physical contact with the SM or the material surrounding the SM. The stiffness of the SM can be determined from a (first) slope of a first deflection curve obtained from the plurality of sensors S2, which is one of the two sensor types, versus an applied load curve, based on the driving mechanism DM applying different loads, which is obtained from the sensor S1, and a (second) slope of a second deflection curve obtained from the sensor S3, which is the other of the two sensor types, versus the applied load curve. The second sensors S2 measure the first deflection of the SM and the third sensor S3 measures the second deflection of the SM. Combining both types of sensors allows multiple measurements of stiffness, providing for a more robust and reliable measurement system.

The frame assembly FA provides a rigid platform on which the SM can rests, and has sufficient rigidity so that any deformation it may undergo would be negligible versus the deflection that the SM undergoes when it is stressed. Specifically, the frame assembly FA includes a base FA1 that is restable on a stable support SS, such as a floor or a table, a distal frame (support structure) FA2 that is held spaced from the base FA1 at a predetermined distance, which can be adjustable, and a movable support FA3 that is configured to be movable between the base FA1 and the distal frame FA2.

Referring to FIGS. 1-6, the base FA1 and the distal frame FA2 can be made of steel, aluminum, rigid plastic, or carbon fiber material, or any combination thereof. Specifically, in the illustrated embodiments, the distal frame FA2 can be constructed from a pair of rigid main beams FA2a that are spaced apart parallel along a horizontal plane and secured in that position using a plurality of support plates FA2b and cross beams FA2c so that the main beams and the cross beams form a rigid structure that is not prone to deflection when the SM undergoes stress. The main and cross beams also can be stacked to provide an even more rigid platform. The beams can include channels/slots for anchoring bolts and nuts, such as shown in FIGS. 1-3 and 5 for attaching accessories, such as the second sensors 2 and the loading members LMu, LMl. The main and cross beams are commercially available. For example, heavy duty commercially available T-Slot aluminum extrusion rails can be used, such as available from McMaster-Carr (https://www.mcmaster-.com/t-slotted-framing) or 80/20 Inc (https://8020.net/shop) .). By loosening two outermost bolts B (see FIG. 3), which secure the two support plates FA2b fastened to the cross beam FA2c to the main beams FA2a, the respective cross beam FA2c can be moved in the longitudinal direction of the main beams FA2a and securing those bolts will maintain the cross beam in place. Moving the cross beams also move the respective sensors S2 and the loading members LMu mounted thereto. Accordingly, the mechanism for adjusting the sensors and the loading members corresponds to the support plates FA2b and the bolts securing the cross beams FA2c to the main beams FA2a.

Figure 5:
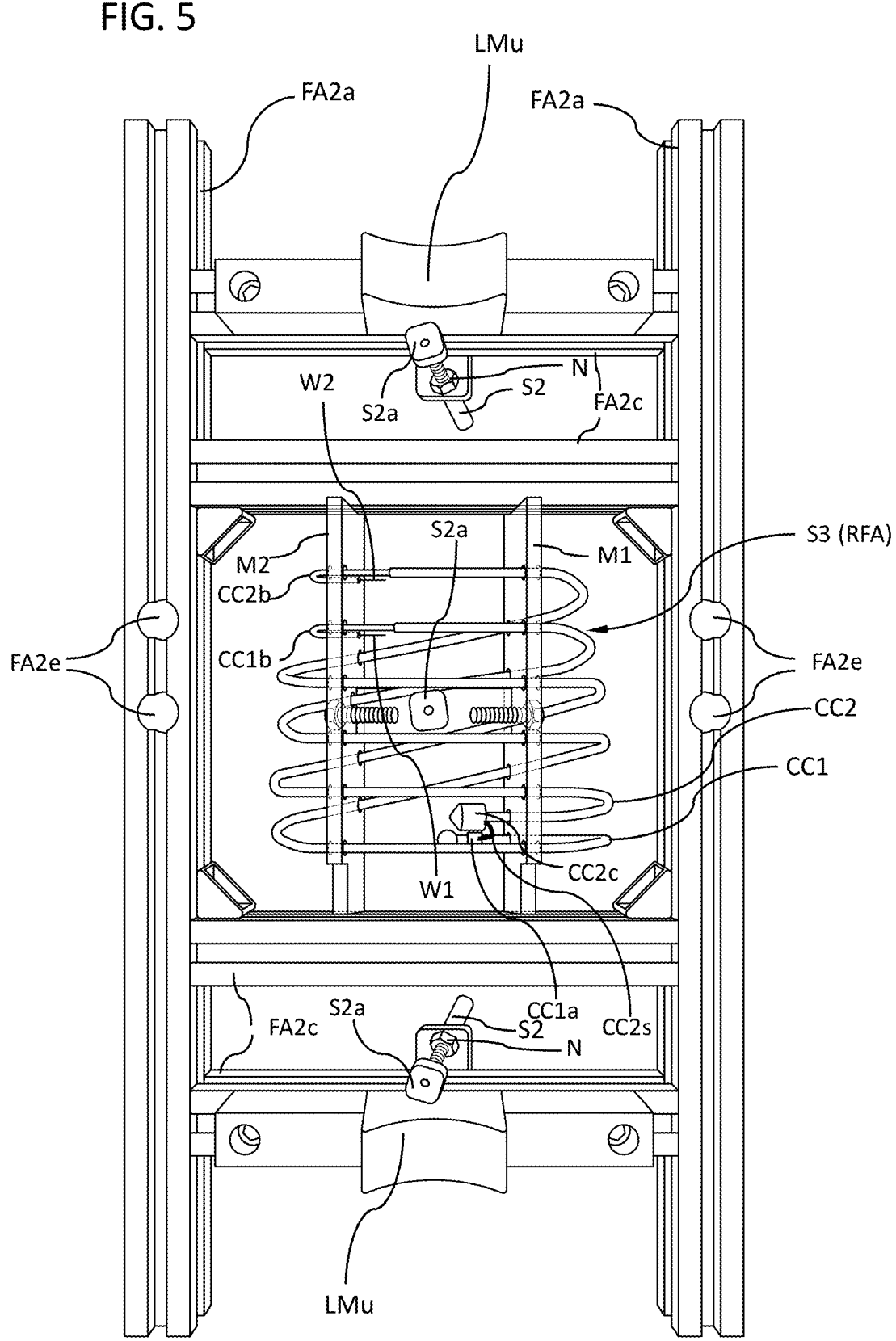
FIG. 5 illustrates a bottom view of the distal frame.
Figure 6:
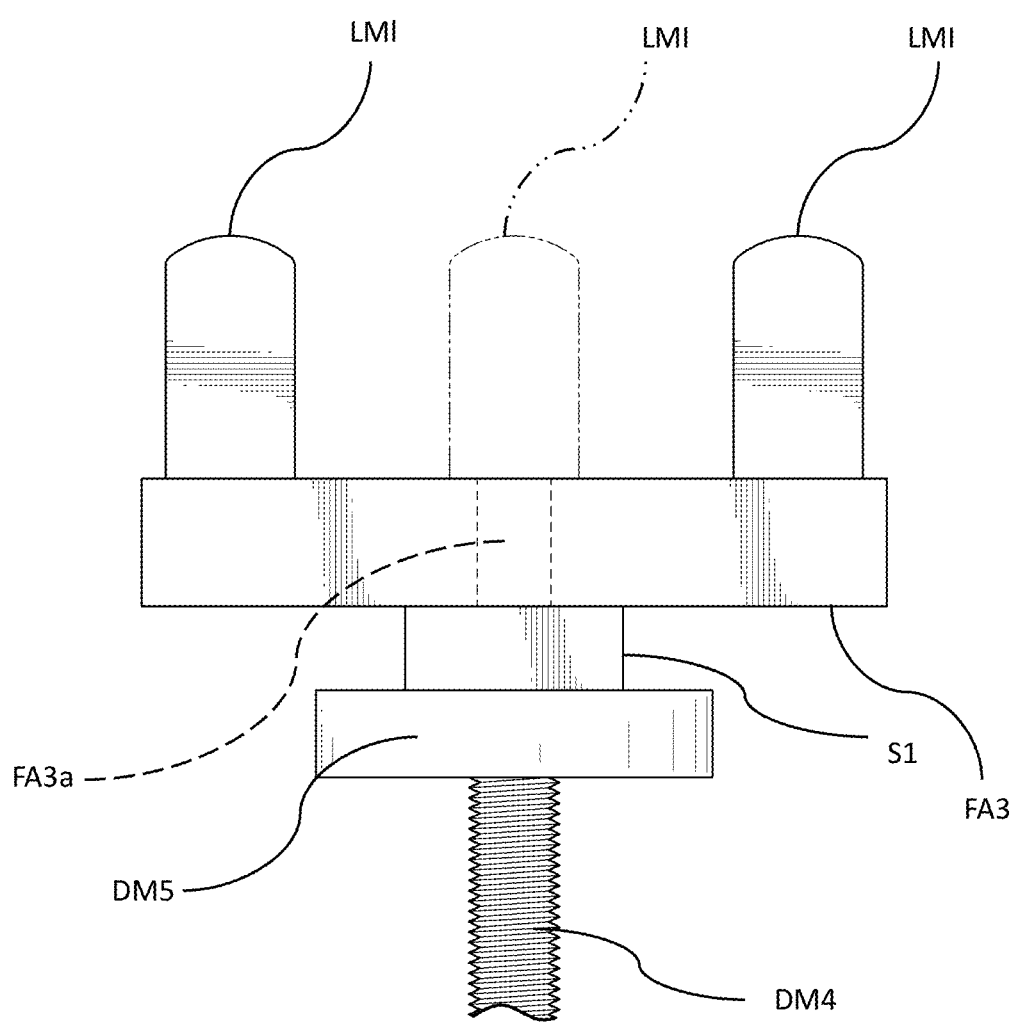
FIG. 6 illustrates an alternative embodiment of a movable support that includes multiple lower loading members to provided multiple lower loading points.

Referring to FIGS. 1 and 5, the distal frame FA2 includes a plurality of upper loading members LMu, each of which can be disposed along a length of the main beams FA2a and secured to a desired position in relation to the SM, to the cross beams FA2c using fasteners. The upper loading members LMu can be mounted to the cross beams FA2c, as illustrated in FIGS. 1 and 5. Adding more cross beams FA2c further increases the rigidity of the distal frame FA2. Moreover, the position of the cross beams FA2c can be adjusted by loosening the bolts Referring to FIGS. 1-2, the base FA1 can be made from an aluminum or steel plates to rigidly mount the distal frame FA2, the movable support FA3, guide rods FA4, and the driving mechanism DM. In this respect, the base FA1 can be made from rigid material and construction that can support the movable support FA3 and the distal frame FA2, as well as the driving mechanism DM. The frame assembly FA also includes at least a pair of rigid guide rods or rails FA4 that space and maintains the distal frame FA2 spaced from the base FA1 at a desired distance, which can be adjusted, for example by replacing the guide rods having different lengths. Moreover, each guide rod FA4 can include threaded ends that can be bolted securely against the base FA1 and the distal frame FA2 and to provide a sufficient tension therebetween, as well as allowing fine height adjustments. Although the illustrated embodiment is shown with just a single pair of guide rods FA4, additional pairs of guide rods can be included, particularly when the width of the movable support FA3 becomes larger, such as when the movable support FA3 includes multiple lower bending members FA3a, such as schematically illustrated in FIG. 6. In this respect, each of the main beams FA2a can include at least a pair of through holes FA2e spaced along the length direction thereof each for receiving a guide rod FA4. See FIGS. 3 and 5. Similarly, the movable support FA3 also includes at least one pair of through holes FA3a each for receiving a guide rod. See FIGS. 1-3, 5, and 6.

Moreover, the guide rods FA4 further allow the movable support to slide therealong as the movable support moves between the base and the upper frame. At least one lower loading member LMl is secured to the movable support. FIG. 1 shows a single lower loading member LMl and two upper loading members LMu to provide a three-point bending deflection system, while FIG. 6 shows two lower loading members LMl disposed at the movable support and two upper loading members to provide a four-point bending deflection system. This embodiment also can be used with just a single lower loading member LMl (illustrated in phantom).

The movable support FA3, as well as each of the upper and lower loading members LMu, LMl, can be made from a block of plastic material, such as high density polyethylene, aluminum, steel, wood, or a composite material, such as carbon fiber. Each loading member LMu, LMl can be contoured to the match the shape of the SM for better support, and has a width that allows the SM to bend along multiple points. For example, the width of the loading members can range from 1 cm-15 cm, depending on the length of the SM.

The driving mechanism DM can be any conventional commercially available mechanical devices that can move the movable support toward or away from the distal frame FA2 (or away or toward the base FA1). For example, the driving mechanism DM can be a linear jack screw, such as a worm gear screw jack (Classic, IMA Series) available from https://www.seshagirigears.com or from McMASTER-CARR (https://www.mcmaster.com/screw-jacks). Rotating a shaft, such as using a motor or hand crank, translates a rotary motion of the crank into a linear motion, namely pushing or pulling motion.

Figure 2:
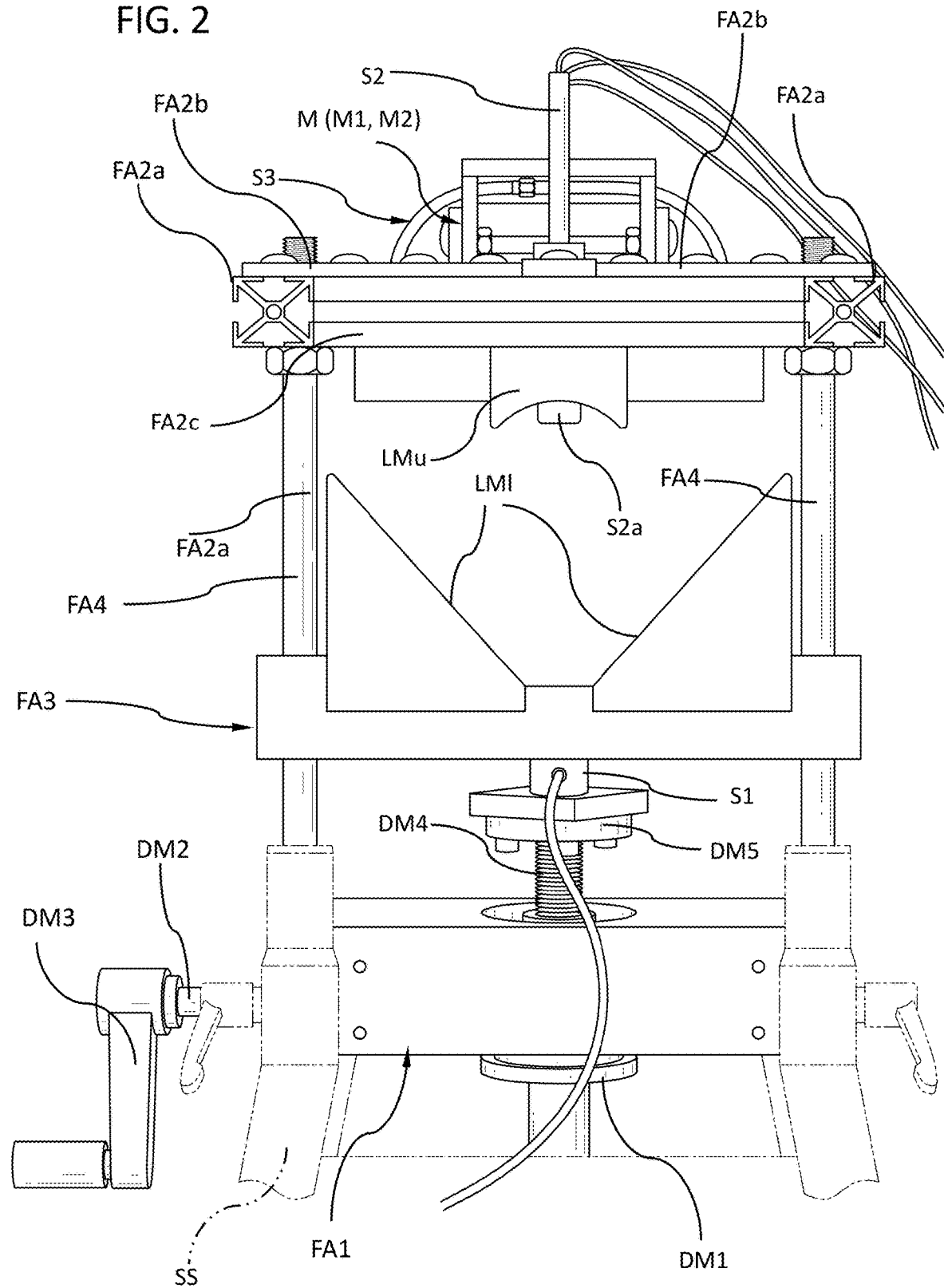
FIG. 2 illustrates a front view of the loading device.

Referring to FIGS. 1-2, a jack screw type driving mechanism can includes a main housing DM1, a driving shaft DM2, a hand crank DM3, a driven shaft DM4, a driving-worm gear (not illustrated), a driven-worm gear (not illustrated), and a support platform DM5. The driven shaft DM4 is rotatably supported and typically includes an external acme threading along the substantial length thereof. The driving-worm gear is coaxially arranged with the driving shaft DM2, which is rotatably mounted to the main housing DM1, so that it can only rotate. That is, the driving shaft is held so that it cannot move along the axial direction of the driving shaft. The driving-worm gear can have external worm gear teeth, which can be integrally formed with or mounted to the driving shaft DM2. The hand crank DM3 is mounted to the driving shaft DM2 so that rotating the hand crank rotates the driving shaft DM2, which rotates the driving-worm gear in the direction of the rotation of the hand crank.

The driven-worm gear is coaxially arranged with the driven shaft DM4 and can include external worm gear teeth that mesh with the external gear teeth of the driving-worm gear. The driven worm gear further includes an internal acme threading that meshes with the external acme threading of the driven shaft DM4. The driven-worm gear is rotatably mounted to the main housing but is prevented from moving in the axial direction of the driven shaft DM4. Thus, rotating the driven-worm gear via the driving shaft DM2 (by rotating the crank DM3) rotates the driven shaft DM4. This causes the driven shaft DM4 to move axially, either away from or toward the main housing, depending on the rotation direction of the crank. Instead of the crank, a motor can be used to drive the driven shaft using a controller or a computer.

The support platform DM5 is rotatably mounted to the distal end of the driven shaft DM4 to enable the driven shaft DM4 to rotate relative to the support platform DM5, such as using a bearing. The support platform DM5 supports the movable support FA3 so that raising the support platform DM5 raises the movable support toward the distal frame FA2.

The upper loading members LMu and the at least one lower loading member LMl, which are configured to provide multiple bending points, are disposed facing each other to apply an opposing force to the SM from the opposing sides. With the SM sandwiched between the upper loading members LMu and the at least one lower loading member LMl, rotating the crank DM2 to rotate the driven shaft LM4 and elevate the support platform LM5 toward the distal frame FA2, moves the movable support FA3 in the same direction to apply a load to the SM.

The first sensor S1 can be a conventional load cell disposed between the driving mechanism DM and the movable support FA3 for measuring the force applied by the driving mechanism DM to the SM. For example, the sensor S1 can be used include a load cell, such as Honeywell Model 31 (https://sensing.honeywell.com/test-measurement-products/miniature-stainless-steel-load-cells/model-31) and Model 41 (https://sensing.honeywell.com/test-measurement-products/stainless-steel-low-profile-load-cells/model-41). Specifically, the load cell can be disposed underneath the movable support FA3, between the movable support FA3 and support platform DM5 so that it can measure the amount of force the driving mechanism DM is applying to the SM.

Figure 3:
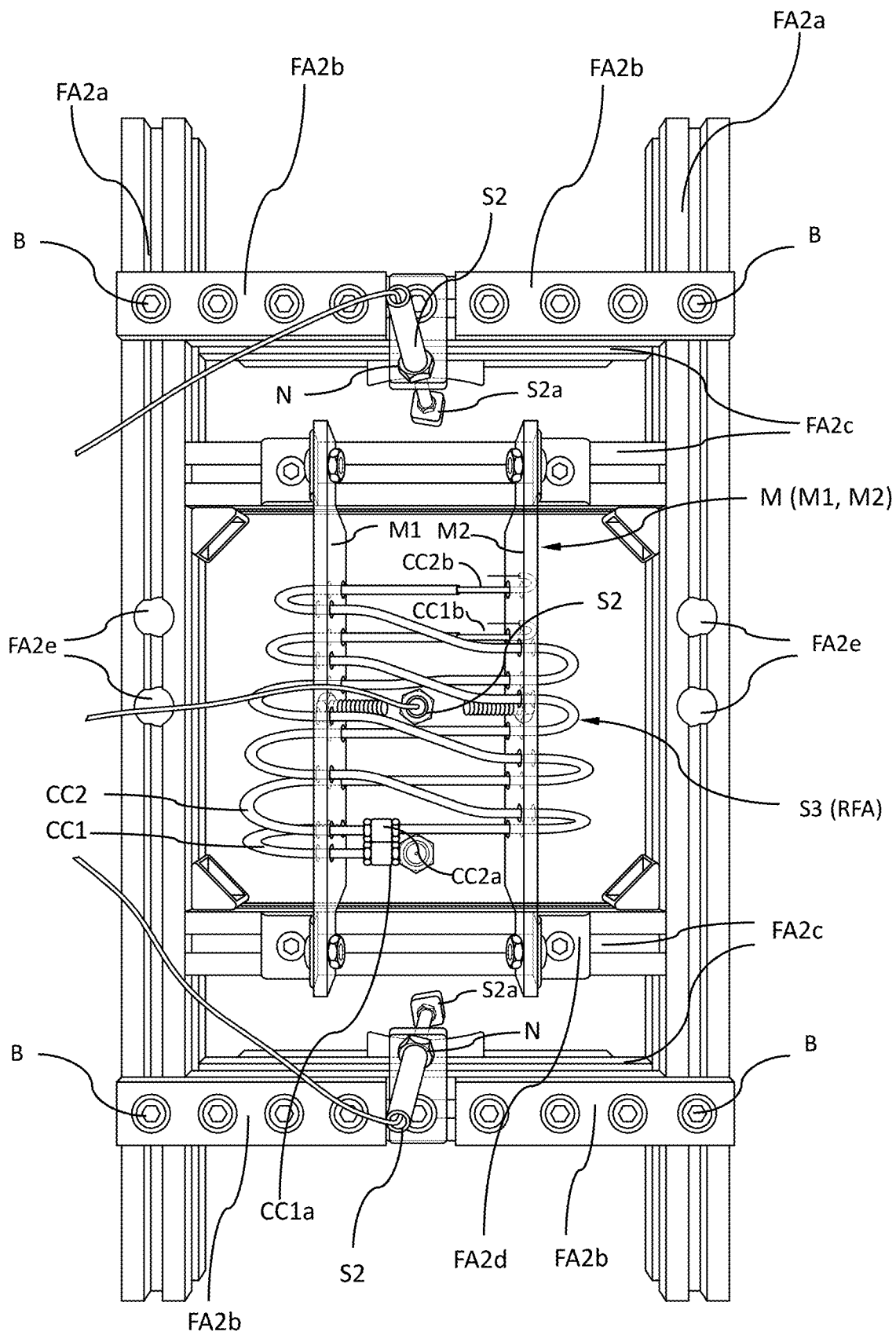
FIG. 3 illustrates a top view of a distal frame (support structure) of the loading device.

The second sensors S2, on the other hand, each are mounted to the distal frame FA2 and positioned along the length thereof at desired positions, and substantially aligned centrally with the sensor S3, for measuring a deflection around the SM. Each of the sensors S2 include a contact pad S2a, where its position is adjustably displaceable longitudinally (e.g., perpendicular to the longitudinal direction of the distal frame FA2) to permit each pad to be in contact with the SM during measurements. Specifically, as shown in FIGS. 1 and 3, the sensor can have a threaded shaft and using a pair of nuts N to position the pad at a desired height. The third sensor S3, on the other hand, is a non-contact type, and uses a radio frequency antenna RFA disposed spaced from the SM and mounted to the distal frame FA2 to measure the deflection of the SM without using any strain sensing device attached to the SM and/or the material surrounding the SM. There is no contact between the SM and the antenna RFA.

As noted earlier, the present development uses two distinct types of displacement sensors S2, S3 that can be mounted to the distal frame held stationary in relation to the base FA1. In the illustrated embodiment, the first type can be three linear displacement sensors (hereafter displacement sensor), such as DVRTs (Differential Variable Reluctance Transducer) or LVDT (Linear Variable Differential Transducer), positioned along the length of the distal frame to function as linear displacement sensors to measure the displacement of the material (e.g., skin) surrounding the SM. As illustrated, two linear displacement sensors S2 are located adjacent to two upper loading members LMu while the third linear sensor S2 is located at the midpoint between the two upper loading members LMu. The two outer displacement sensors LMu can measure the baseline displacement due to compliance in the material (e.g., soft tissue) surrounding the loaded SM. The centrally located displacement sensor S2 measures the total displacement due to the material (e.g., soft tissue) compliance when loaded. Subtracting the average displacement of the two outer displacement sensors S2 from the displacement of the central displacement sensor S2 results in the deflection of the loaded SM due to bending.

The displacement sensors S2, as mentioned can be DVRTs or LVDT, which are commercially available, for example, from MicroStrain/LORD Sensing (https://www-.microstrain.com/displacement/nodes) or Omega Engineering (https://www.omega.com/subsection/displacement-proximity-transducers-all.html).

Figure 7:
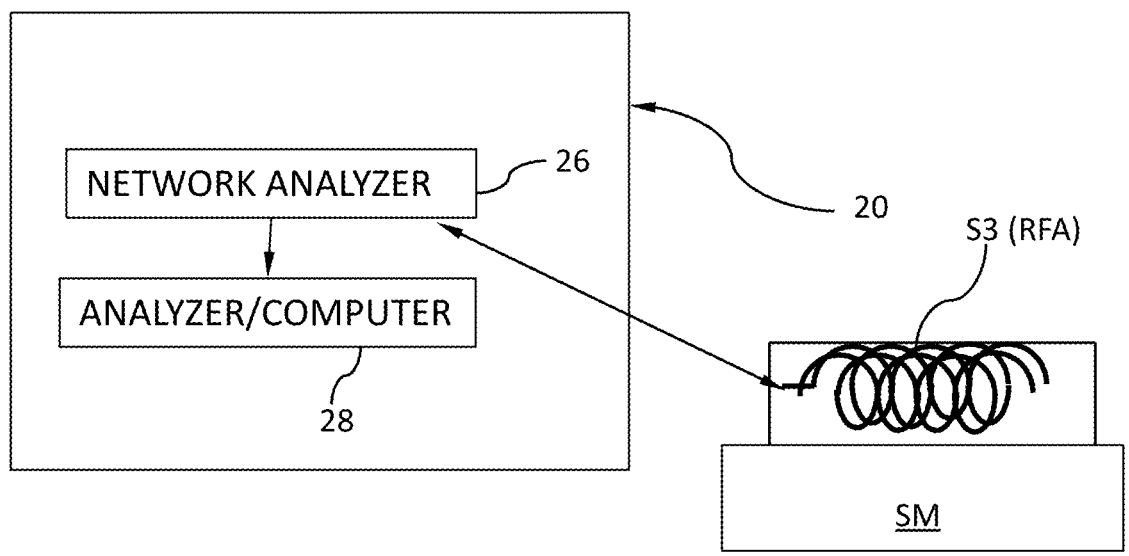
FIG. 7 schematically illustrates an embodiment of a system that can monitor changes in the structural member.

Referring to FIG. 7, the second type of deflection sensor is a radio frequency antenna RFA, which can be powered by a network analyzer 26 that includes an ND converter. The network analyzer measures the S11 parameter (return loss) of the antenna RFA. The resonant frequency of the antenna is determined as the frequency location of the local minima of the S11 parameter dB response. The antenna's resonant frequency is sensitive to the location of objects in the near field, and is especially sensitive to metallic objects. Therefore, the antenna RFA can function as a proximity sensor and can measure deflections of the SM, such as extremity together with the implanted hardware, which is typically metallic.

The deflection measured from the antenna RFA is advantageous because it does not contact the SM and measures the deflection of the construct as a whole instead of relying on skin deflection of an extremity for example. The displacement sensors S2 are advantageous because they can provide displacement measurements at multiple locations along the length of the loaded extremity, allowing for accounting displacements due to soft tissue compliance. The stiffness of the target construct can be obtained from the slope of the deflection curve versus the applied load curve.

Figure 4:
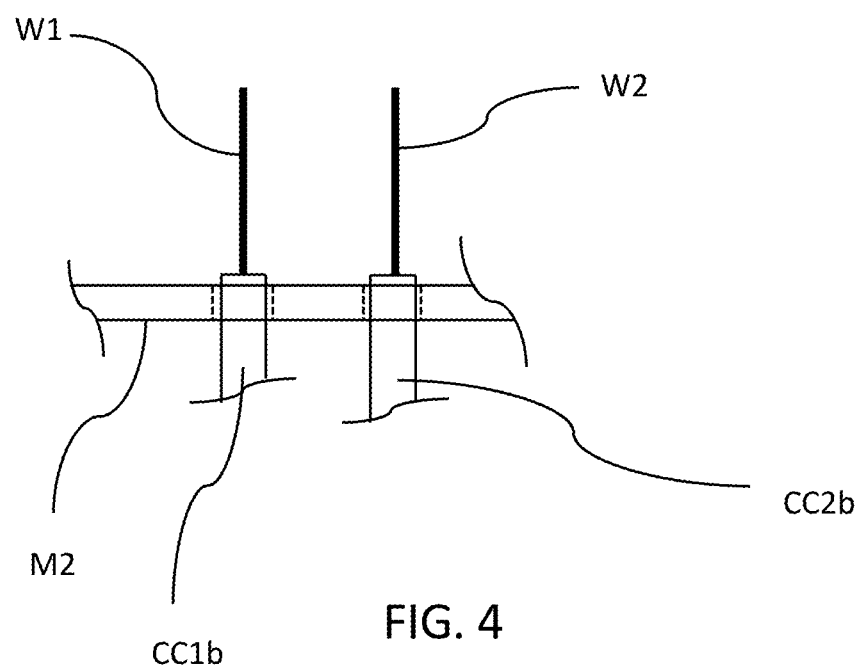
FIG. 4 illustrates an enlarged view of an antenna configuration more clearly illustrating the arrangement of the free end of the antenna, the center conductor of the coaxial cables are exposed.

Specifically, referring to FIGS. 3-5, the antenna RFA can have a dipole configuration, using a pair of coiled coaxial cables CC1, CC2 (although non-coiled type antennas can be used). But only one of the two cables, such as cable CC1, is connected to the network analyzer to obtain the S11 parameter. Using the center conductor W1, the S11 parameter, which can be measured with the cable CC1 connected to port 1, represents the ratio of the power sourced at port 1 that is returned back to port 1, also known as the "return loss." At the antenna's resonant frequency, the S11 parameter reaches a local minima. The outer shield of the other cable CC2 of the antenna RFA can be grounded to the outer shield of the cable CC1 that is grounded to the port 1.

For example, referring to FIG. 5, the outer shields of both coaxial cables, at one (first and third) ends thereof, can be electrically connected to each other at a coaxial connector CC1a that allows connection of an extension coaxial cable that connects to port 1 of the network analyzer. For example, this can be achieved by connecting the shield CC2s (FIG. 5) of the cable CC2 to the connector CC1a provided at the cable CC1. Alternatively, as illustrated in FIG. 3, the cable CC2 also can include another coaxial connector CC2a at the one (third) end and secure the two metal connectors so they make good contact and permit electrical connection. Alternatively, connectors CC1a can use a Y-type connector (not shown) to connect both the connectors CC1a and CC2a to ground the shields to each other. Although FIG. 5 illustrates the bottom view of FIG. 3, the embodiment of FIG. 5 includes a terminating cap CC2c instead of the connector CC2a.

It should be noted that the center conductor W2 of the cable CC2 is isolated from the coaxial connector CC1a (or the Y-type connector). At the other (second and fourth) ends of the cables CC1, CC2, the outer jackets and the shields, and any foil shields are stripped off to expose the dielectric insulators CC1b, CC2b. Moreover, referring to FIGS. 3-5, part of each exposed dielectric insulator is stripped off to expose the respective center conductors W1, W2.

Still referring to FIGS. 3-5, a mount M is installed on the distal frame FA2 using brackets FA2d and fasteners. The mount M maintains the antenna RFA in a static position in relation to the distal frame FA2. Specifically, the mount M includes a pair of spaced plates M1, M2, preferably non-metallic, that are spaced apart. The pair of plates M1, M2 include a plurality of through holes, through which the cables CC1, CC2 are inserted through to provide a coiled configuration for each of the cables CC1, CC2.

Referring to FIG. 4, which provides an enlarged schematic view of the free (second and fourth) ends of the cables CC1, CC2, the exposed center conductors W1, W2 are held substantially parallel to each other. This can be achieved by securing the ends of the exposed dielectric insulators CC1b, CC2b in the pair of spaced through holes in the plate M2, such as by hot gluing them in place in the through holes, while they are aligned substantially parallel. The exposed center conductors also can be bent to position them substantially parallel to each other. This allows the center conductors W1, W2 of the two coaxial cables CC1, CC2 to interact with each other via their electric fields. These center conductors W1, W2 are spaced from each other at the second and fourth ends, but otherwise just terminate without connecting to anything. Only the center conductor W1 of the cable CC1 at the first end is used to connect to the network analyzer 26. The length of the exposed center conductors W1, W2 can be in the range 0.5 cm-20 cm. In the present embodiment, the ideal length of the exposed center conductors W1, W2 is around 4 cm.

The cable CC2 is merely a dud as, while the shields of both cables are grounded, the center conductor of the cable CC2 is not connected to the network analyzer or anything else. Although the cable CC2 is not directly used in signal analysis, it can help to eliminate noise compared to a monopole antenna. For either antenna configuration, the SM affects the frequency at which the local maxima or minima occurs when the SM is loaded.

Specifically, a metal plate or rod associated with the SM (e.g., a fractured tibia fixed with an intramedullary nail) corresponding to SM can be interrogated from the side of the coiled cables. Certain locations along the length of the coaxial cable has the greatest shift in signal. These locations depend on the resonant frequency harmonic that is measured. The coiled shape increases the signal strength by aligning the locations along the cable length where the signal is strongest. The antenna parameters can be optimized by adjusting the antenna length, spacing between coils, and resonant frequency harmonic, while interrogating a reference stainless steel bar at known distances from the antenna. Increasing the spacing between the coils increases the signal strength but also increases noise. Higher frequency harmonics also result in a stronger signal but greater noise.

Upon directing and emitting an alternating magnetic or electromagnetic field through a pre-determined frequency sweep using a source integrated in the network analyzer (or an external source if the network analyzer is not provided with the source) toward the SM, the SM interacts with the applied electromagnetic field through near field effects. The SM becomes electromagnetically coupled to the antenna RFA. The distance between the SM and the antenna can be represented by characteristics of the electromagnetic field coupling between the antenna and the SM. As the distance between the antenna and the SM changes, the characteristics of the electromagnetic field coupling between the antenna and the SM shifts because the fundamental coupling between the antenna and the SM becomes altered. For example, inducing deflection in the SM by applying a load using the driving mechanism DM changes the distance between the antenna and the SM, while the antenna RFA remains fixed in space relative to the distal frame FA2, resulting in an alteration in the resonance frequency due to changes in the electromagnetic coupling between the antenna RFA and the SM.

The S-parameters of the antenna can be obtained by the connected network analyzer 26 or the connected analyzer/computer 28. The analyzer/computer 28 can determine the resonance frequency, as well as the S-parameter magnitude of the antenna if coupled to the SM via the ND converter, without the need for any strain sensor directly attached to the SM. If a separate source, which can be an inductor or other conventional apparatuses for applying electromagnetic fields in the radio frequency spectrum, the network analyzer can just be an ND converter, and the analyzer/computer 28 can execute the functions of the network analyzer 26 using software.

In operation, the antenna RFA is spaced from the SM so that it does not touch any surface of the SM or the SM and/or surrounding material during the operational conditions. The electromagnetic field surrounding the antenna RFA is affected by objects in the near field range due to the conductive and/or dielectric properties of the SM. A conductive material has an eddy current induced, which in turn causes the material to act as an antenna itself, thus altering the electromagnetic field. A non-conductive dielectric material can also alter the electromagnetic field via the electromagnetic polarization of the material. Therefore, the SM can be any material that is conductive and/or has a relative permittivity (i.e., dielectric constant) that is different than the relative permittivity of the surrounding medium (e.g., air).

The components of a monitoring system 20 can include the network analyzer 26, such as a commercially-available Tektronix TTR503A Network Analyzer and Rohde & Schwarz ZVB4, which can apply electromagnetic fields in the radio frequency spectrum, the antenna interface, which includes the antenna RFA, including any wire extension extending from the antenna wires, and the analyzer 28, which can be a computer that reads and analyzes the data output from the network analyzer or stored over a period, or otherwise receives data that has been accumulated over the period. The operating frequency range of the present monitoring system can be 10 MHz to 4 GHz, with the preferred range being 40 MHz to 500 MHz for biomedical applications.

Figure 8:
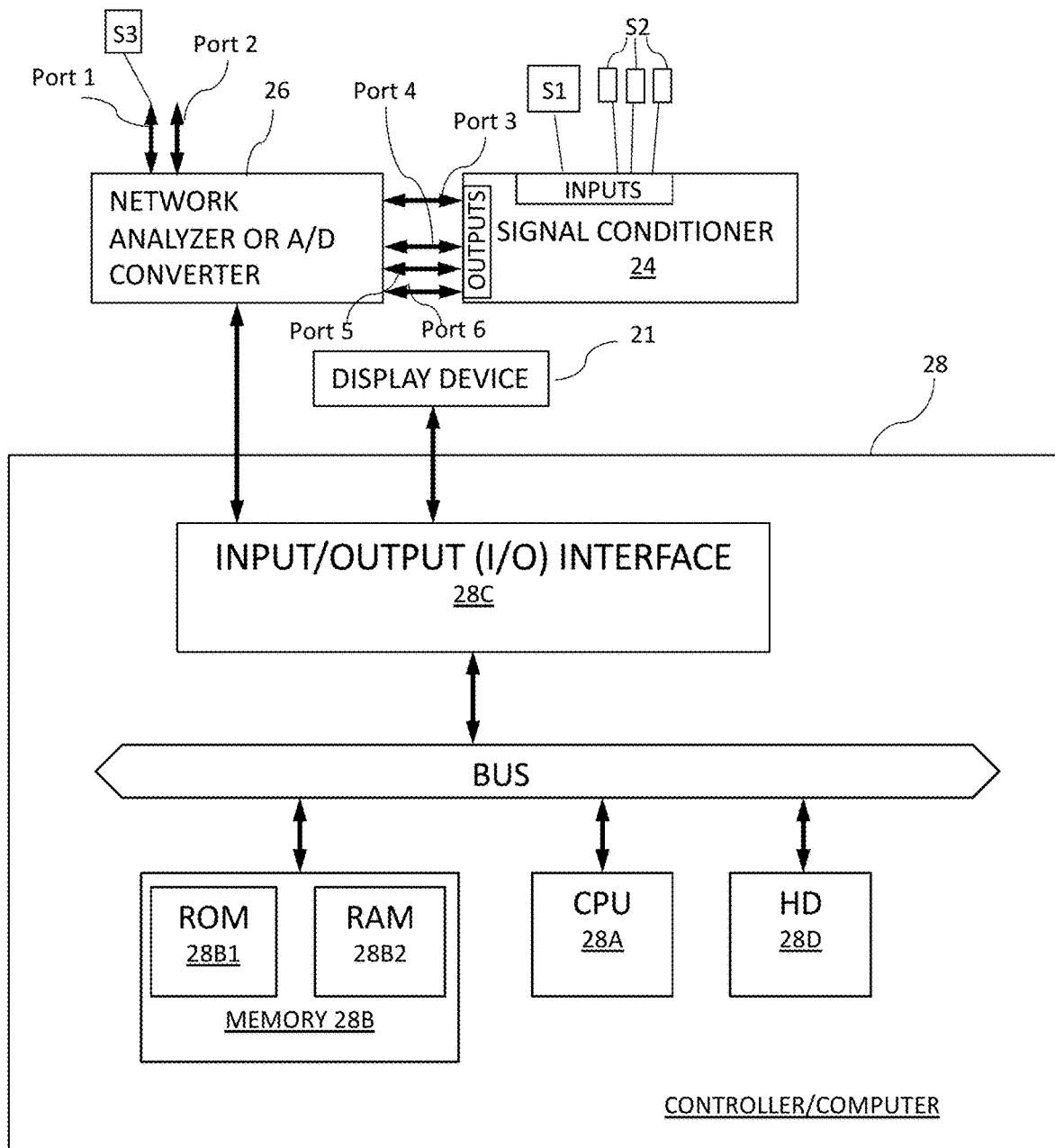
FIG. 8 illustrates a controller or computer that can determine the instantaneous or temporal change in stiffness of the structural member (over an evaluation period).

FIG. 8 schematically illustrates the analyzer 28, which comprises a controller or computer that can be programmed to analyze the shifts in the characteristics of the electromagnetic field coupling between the antenna RFA and the SM over an evaluation period or a predetermined number of measurements of the characteristics of the electromagnetic field coupling between the antenna and the SM obtained over a predetermined interval. The computer includes CPU (processor) 28A, memory 2(B), I/O (input/output) interface 28C. The I/O interface 28C can include a communication interface, such as Ethernet, for communication to a network and Internet, a display interface for connecting to a display device 21, and typical interfaces, such as USB, for connecting peripheral devices, including a keyboard and a mouse, as well as the network analyzer or any other device that can obtain the frequency sweep from the electrical signals obtained from the antenna RFA. The network analyzer 26 can be either a standalone apparatus, which can also be connected to the computer via the I/O interface 28C, or a peripheral device that converts the electrical signals from the antenna RFA into digital signals (e.g., ND converter) readable by the computer, and can be connected to the computer 28 via either the Ethernet, USB or serial port.

The computer 28 can determine the characteristics of the electromagnetic field coupling between the antenna and the SM from the electrical signal data obtained by the network analyzer 26 across a pre-determined frequency range. The functions of the network analyzer are well known and are commercially available either as a standalone unit or software operated unit using an ND converter, such as a commercially available Tektronix TTR503A and Rohde & Schwarz ZVB4 network analyzers. Alternatively, the computer 28 can analyze the stored data of the characteristics of the electromagnetic field coupling between the antenna and the SM determined and read over an evaluation period or a predetermined number of times read over a predetermined interval by the network analyzer 26. The storage device can be a memory drive within the computer itself, flash memory, network drive, or remote database connected over the Internet.

The memory 28B communicates with the CPU 28A via a bus. The memory 28B can include a ROM 2861 and a RAM 12862. The memory 28B also can be configured as a non-volatile computer storage medium, such as a flash memory, instead of the RAM and the ROM. The computer 28 can also include a removable memory (e.g., flash card) connected via the I/O interface using, for example, USB or any other conventional memory card interface, and conventional hard disk 28D. The memory 28B and hard disk 28D are some embodiments of a non-transitory machine-readable medium that can store instructions, which, when executed by the processor, that perform various operations. These operations include, but are not limited to, controlling/operating the source connected to the I/O interface 28C, controlling/operating the network analyzer connected to the I/O interface 28C, determining the characteristics of the electromagnetic field coupling between the antenna RFA and the SM, determining the shift in characteristics of the electromagnetic field coupling between the antenna and the SM based on the electrical signals received from the antenna RFA in response to an electromagnetic field applied at different times over the evaluation period, and determining the temporal change in the displacement of the SM per the applied load, based on the shift in characteristics of the electromagnetic field coupling between the antenna and the SM.

Figure 9:
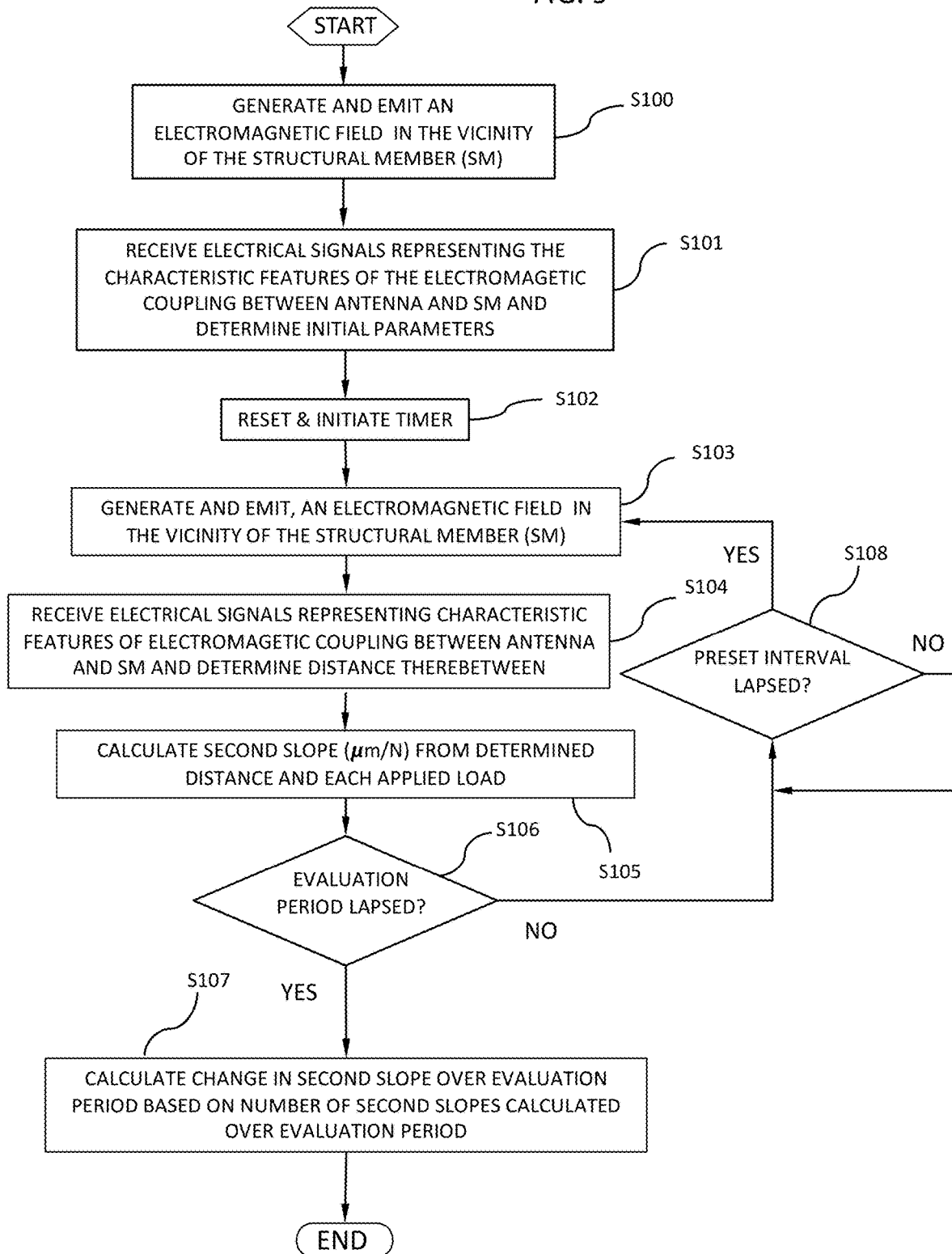
FIG. 9 illustrates an operational diagram, namely a flowchart of the present system for monitoring the stiffness in the structural member based on one sensor type (antenna).

FIG. 9 illustrates an operational flow of the monitoring system that can monitor the changes in the SM based on the antenna RFA. After the SM has been secured to the loading device, at S100, the network analyzer 26 (or the external source) is controlled to generate, emit, or direct an electromagnetic field over a pre-defined frequency bandwidth towards the SM using the antenna RFA. The SM interacts with the emitted electromagnetic field when subject to an alternating magnetic or electromagnetic field. In S101, the network analyzer 26 outputs a (first) signal to the antenna RFA, which causes the antenna RFA to output an (second) electrical signal based on the coupled electromagnetic field. The output electrical signal received from the antenna RFA is input to the network analyzer 26. After either the networks analyzer 26 or the controller determines the initial characteristics of the electromagnetic field coupling between the antenna RFA and the SM, which represents these parameters at the initial or start period, they can be stored in any of analyzer/computer 28, remote database, or local/portable storage device.

Figure 10:
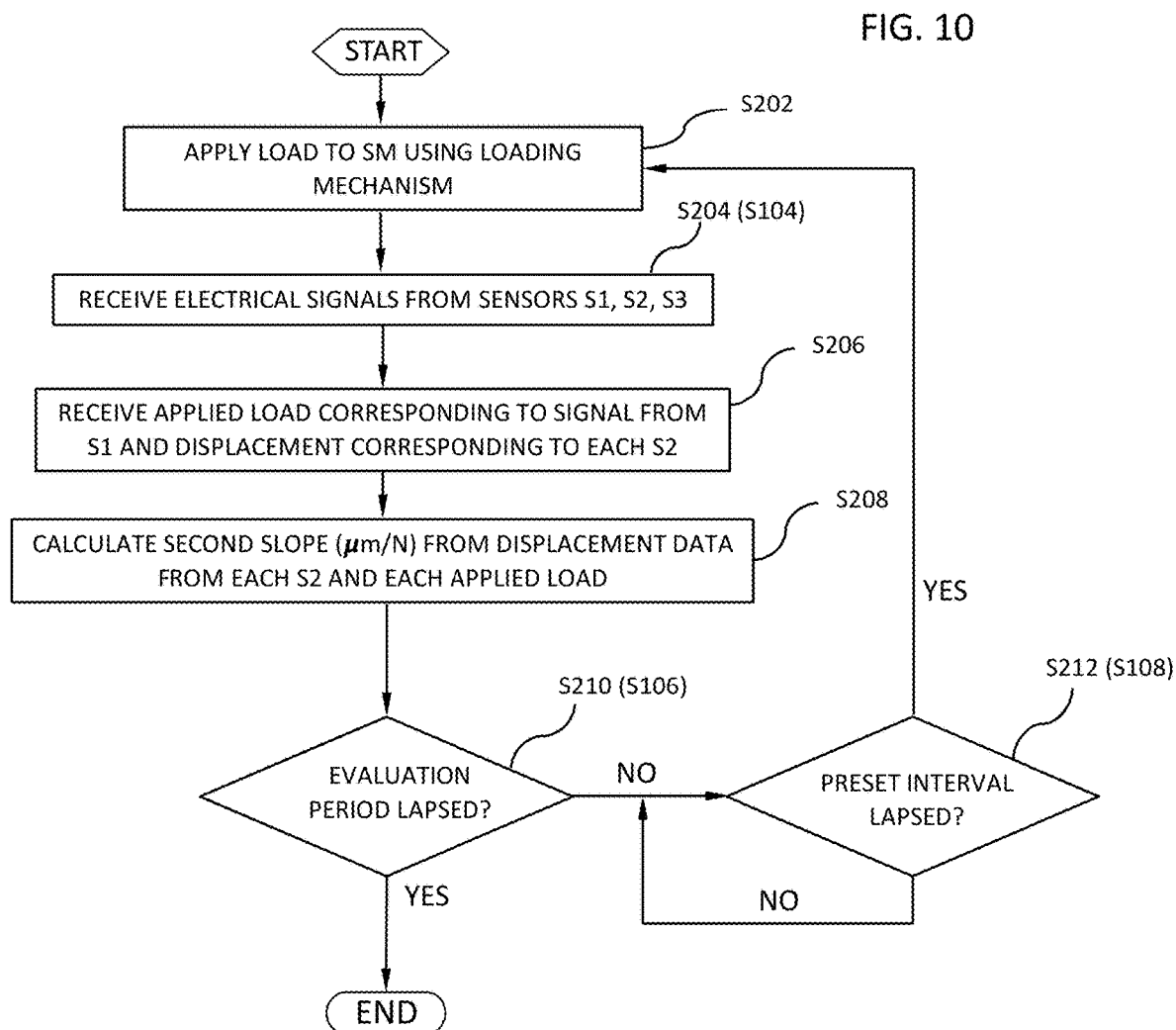
FIG. 10 illustrates another operational diagram, namely a flowchart of the present system for monitoring the stiffness in the structural member based on another sensor type (displacement sensors).

At S102, after determining the initial characteristics of the electromagnetic field coupling between the antenna RFA and the SM, a timer or a counter is reset (i.e., evaluation starting point at which the initial characteristics of the electromagnetic field coupling between the antenna RFA and the SM has been set as a reference point). For accurate positioning of the SM after setting the reference, the initially read (reference) parameters can be used as a reference to accurately position the SM for taking subsequent multiple measurements. The timer/counter can be set using the controller or a standalone timer. Alternatively, the technician monitoring the target area can keep a calendar or manually keep track of the time and date as to when the characteristics of the electromagnetic field coupling between the antenna RFA and the SM are read in relation to the applied load. At a predesigned or desired time interval after the initial characteristics of the electromagnetic field coupling between the antenna RFA and the SM have been determined, process/step S103 essentially repeats S100, and process/step S104 (corresponding to S204 in FIG. 10) repeats process/step S101 to determine the current characteristics of the electromagnetic field coupling between the antenna RFA and the SM under load applied by the driving mechanism DM.

At S105, the analyzer or computer 28 can analyze the previously determined characteristics of the electromagnetic field coupling between the antenna RFA and the SM and the currently determined characteristics of the electromagnetic field coupling between the antenna RFA and the SM and determine the shift of the characteristics of the electromagnetic field coupling between the antenna RFA and the SM by comparing the determined characteristics of the electromagnetic field coupling between the antenna RFA and the SM over different times. The shift corresponds to the change in the distance between the antenna RFA and SM during the loading. Since the data is stored, the shift in the characteristics of the electromagnetic field coupling between the antenna RFA and the SM can be determined after a predetermined number of characteristics of the electromagnetic field coupling between the antenna RFA and the SM over a desired evaluation period has been read, or after the desired evaluation period has lapsed (where a desired total number of characteristics of the electromagnetic field coupling between the antenna RFA and the SM for the desired evaluation period has been determined) (see S107). In this respect, the slope can be calculated from the change in the distance versus the applied loads (curve).

At S106 the analyzer 28 determines whether the evaluation period has lapsed or the desired total number of characteristics of the electromagnetic field coupling between the antenna RFA and the SM has been made after determining each of the characteristics of the electromagnetic field coupling between the antenna and the SM other than the determination of the initial characteristics of the electromagnetic field coupling between the antenna RFA and the SM. If the negative (NO in S106), after the preset interval, which corresponds to the duration or the interval between evaluations over the evaluation period, has lapsed (YES) at S108, processes/steps S103-S105 are repeated until affirmative in process/step S106 (YES). If affirmative (YES in S106), the analyzer 28 ends the evaluation since the evaluation period has lapsed. The temporal changes in relative displacement of the SM are determined based on the determined shift over the evaluation period. The actual temporal changes in the displacement of the SM can be determined by implementing an a priori deformation-electrical parameter or displacement-electrical parameter calibration of the hardware. Data from an electrical parameter-deformation or electrical parameter-displacement calibration, performed in advance, can be stored in memory 28B accessible by the analyzer 28.

For example, the electrical parameter signal, such as resonant frequency, can be calibrated to correspond to the distance of the antenna RFA from surface of the SM. This can be done by measuring the actual distance from the SM in relation to the resonant frequency. The resonant frequency measurement can then be used to determine the relationship between distance and resonant frequency. Because the relationship is known between the resonant frequency and the distance, the relationship can be determined between the resonant frequency and the distance. The resonant frequency measurement can therefore be calibrated to give a direct measure of the distance for that particular SM, environment, and antenna setup, namely making the antenna function as a displacement sensor.

The shift in characteristics of the electromagnetic field coupling between the antenna RFA and the SM can be used rather than the absolute values of the determined characteristics of the electromagnetic field coupling between the antenna RFA and the SM in determining the temporal relative changes in displacement of the SM. Based on the temporal changes in relative displacement of the SM, changes in the target area or biological subject can be determined. For instance, for a fracture fixation plate implanted in a person, these changes can be monitored for use in the diagnosis and the prognosis for the healing of a fractured bone for instance, or a condition of the SM.

When applying the present methodology to fracture healing, the objective is to determine the level of healing that has occurred by testing the mechanical stability of the bone-implant construct. As the healing progresses, the stiffness increases. As the stiffness increases, the deflection of the construct relative to the applied load decreases, and the signal from the antenna, such as resonant frequency shift, also decreases because it is a measure of the construct deflection. Calculating the shift in resonant frequency relative to the load applied to the bone-implant construct provides a measure of the construct stiffness and thus the shift in the mechanical stability. Therefore, the slope of the resonant frequency versus the applied load curve can be calculated. This slope is a good indicator of the stiffness. By determining this slope over time and comparing it to initial measurements, one can determine how the fracture is healing over that time frame.

This methodology is particularly useful for monitoring the relative load on the implant (due to the stiffness of the bone) at predetermined time points, such as every two weeks, throughout the healing of the fracture to monitor or predict the healing progress. As a fracture heals, the new tissue that grows progressively stabilizes the fracture, and therefore increases the relative load borne by the bone and decreases the relative load borne by the implant (orthopedic plate or intramedullary nail). As the load on the plate decreases, the deformation of the implant decreases proportionally, and the characteristics change accordingly, reflecting the stiffness of the bone. Calculating the shift in the signal, such as resonant frequency, relative to the load applied to the implant-bone construct reflects a measure of the relative load on the implant, which corresponds to the amount of deflection or change in the amount of flexing. Therefore, the signal from the antenna can be plotted against the load applied to SM and the change in the deflection amount or the amount of distance moved by the load. The slope of the resulting curve can represent the stability of the SM and the level of healing. If the fracture is not healing properly, the load on the plate changes slowly or does not change over time, which means the amount of deflection does not change. By taking temporal measurements, a physician can monitor the healing progress by determining the change in the deflection amount relative to the initial measurement. The measurement can therefore provide the physician with an early indicator whether the fracture is not healing normally and may need further treatment.

While the data from the antenna RFA is being collected, the data from the load sensor S1 and the displacement sensors S2 can be collected concurrently or serially from a signal conditioner(s) 24, which is connected to the ND converter (or network analyzer) 26 that converts the analog signals output by these sensors to digital signals via ports 3-6. Some examples of signal conditioners include, for the DVRT displacement sensors, LORD MicroStrain, model DEMOD-DC (https://www.microstrain.com/displacement/DEMOD-DC) or model DEMOD-DVRT (https://www.microstrain.com/displacement/DEMOD-DVRT-2).

The load force data output by the load sensor S1 and the deflections amount output by the displacement sensors S3 all can be tracked, while calculating the shift in signal obtained via the antenna RFA via the port 1 of the network analyzer 26. Specifically, referring to FIG. 10, at process/step S202, after the reset and the timer has been initiated in S102 in FIG. 9, the driving mechanism DM applies a desired load to start the evaluation. In process/step 204, which corresponds to S104 timewise, the network analyzer 26 receives the electrical signals from the sensors S1, S2, and S3. In process/step S206, which corresponds to S104 timewise, the network analyzer 26 receives the applied load corresponding to the signal from the load sensor S1 and the displacement corresponding to the signal from each of the displacement sensors S2. In process/step S208, the analyzer 28 calculates the slope from the displacement data (stored) from each of the displacement sensors S2 versus an applied load curve (multiple applied loads). In process/step S210, which corresponds to S106, the analyzer 28 determines whether the evaluation period or the desired total number of characteristics of the electromagnetic field coupling between the antenna RFA and the SM has lapsed. Process/step S212 corresponds to S108. If the evaluation period has not lapsed, S202-S210 are repeated until affirmative YES in S210 (i.e., the evaluation period ends). If affirmative in S210, the analyzer 28 ends the evaluation.

In the present development, testing was conducted on a bone, namely a fractured tibia fixed with an intramedullary nail or rod, which is metal. But it should be noted that the SM to be tested is not limited to bone medium, but can be applied to any structural material.

Testing I: Healthy Human Tibia

Figure 11:
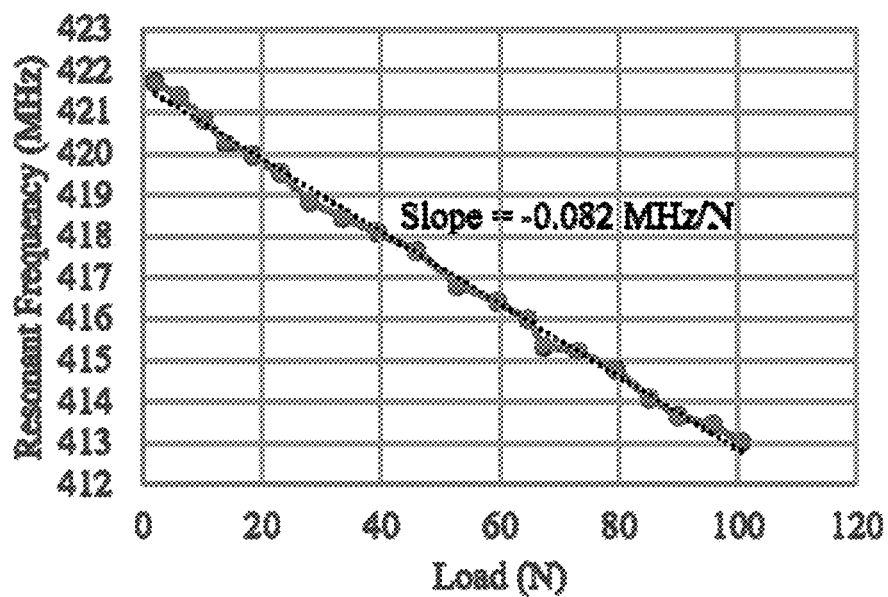
FIG. 11 illustrates an example curve showing antenna resonant frequency versus the applied load.

The loading device was tested on a healthy tibia of a volunteer. The loading frame was set in a three-point bending configuration as illustrated in FIG. 1 with the upper two loading members LMu 35 cm apart, and the lower loading member LMl at the middle thereof. The loading was applied using the driving mechanism DM for five cycles from 0 to 100 N. Separate tests were conducted using the antenna RFA and the displacement sensors S2. The antenna test showed a consistent linear response of the resonant frequency relative to the applied load, as shown in FIG. 11. The mean slope from five cycles of loading was −0.082 MHz/N, and the standard deviation was 0.0027 MHz/N, which is 3% of the mean.

The displacement sensors S2 were tested in a series of experiments to evaluate the corrected displacement measurement used to account for compliance of the soft tissue. The corrected displacement was defined as the center displacement minus the average of the two outside displacements. Experiments were conducted using three methods to achieve various degrees of compliance. First, the loading device was applied in its normal state (A). Second, the loading was applied in a padding state (B) where foam padding was added to the loading points to increase the compliance. Third, the loading device was applied in a strap state (C) where the padding was removed, and the loading points were strapped to the tested leg and tightened to decrease the compliance. The leg was loaded for five cycles, and each test was conducted for three repetitions. Slopes of the displacement/load curves were calculated for both the raw center displacement sensor's displacement and the corrected displacement.

Figure 12:
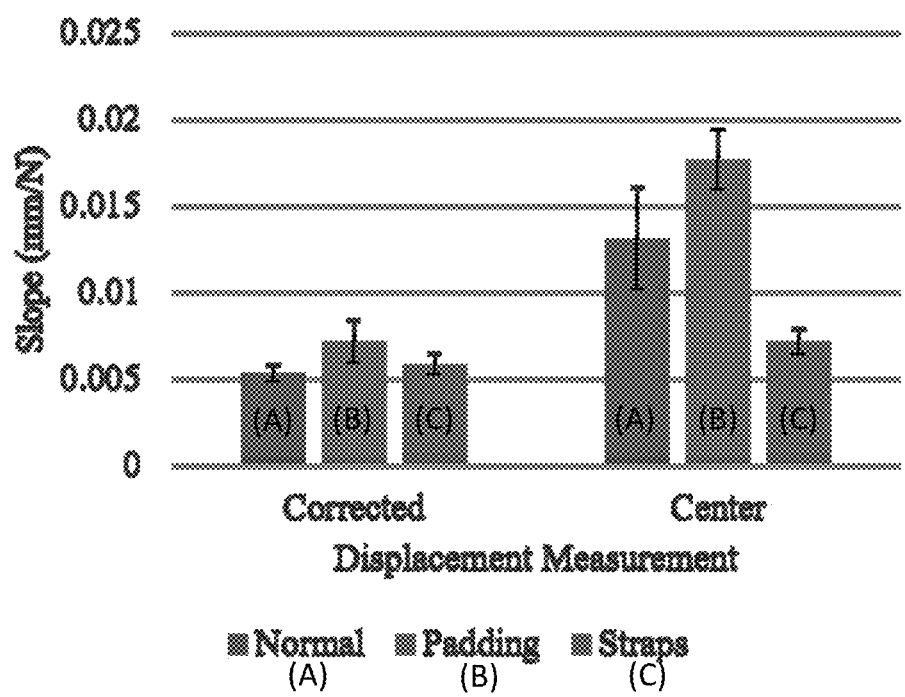
FIG. 12 illustrates slopes (mean and standard deviation) of the a linear sensor displacement versus the load curves for three compliance groups.

Referring to FIG. 12, as expected, the center displacement was highly variable between the three compliance groups (A)-(C) because the center displacement includes the displacement due to compliance and the deflection due to bending. The displacement due to compliance should be variable between the three groups, but the bending deflection was theoretically the same. Because the corrected displacement should be a measure of only the bending deflection, it should be the same between the three groups. The results showed that the corrected displacement was less than the center displacement and had lower standard deviations than the center displacement. There were also smaller differences between the three groups for the corrected displacement, compared to the center displacement. The range of the three groups was 30% of the mean, and 83% of the mean for the corrected and center displacements, respectively. The corrected displacement therefore is an improvement over the raw center displacement for lowering the variability and accounting for changes in compliance.

Additional experiments used the corrected displacement sensors displacement method to test three loading configurations, where the two upper loading members were spaced 35 cm, 23 cm, and 18 cm apart, while using a single lower loading member located centrally of the two upper loading members. Changing the spacing changes the applied bending moment relative to the applied load, while changing the deflection due to bending. Experimental results were compared to analytical solutions of beam defection (δ) due to three-point bending, which were calculated using the equation:

$$\delta = \frac{Pl^3}{48EI},$$

where P is the applied load, l is the length between the upper loading points, E=20 GPa is the elastic modulus of cortical bone according to *Young's Modulus of Trabecular and Cortical Bone Material: Ultrasonic and Microtensile Measurements*, Jae Young Rho, Richard B. Ashman, and Charles H. Turner, 1993 Journal of Biomechanics, Volume 26, Issue 2: pp. 111-119, and I=1.5 $E^{-8}$ m$^4$ is the area moment of inertia of a human tibia according to *The Human Tibia A Simplified Method of Radiographic Analysis of its Cross-Section, with Anthropometric Correlations*, Ira D. Stein and Gerald Granik, 1979 Annals of Biomedical Engineering, Volume 7, pp. 103-116.

Figure 13:
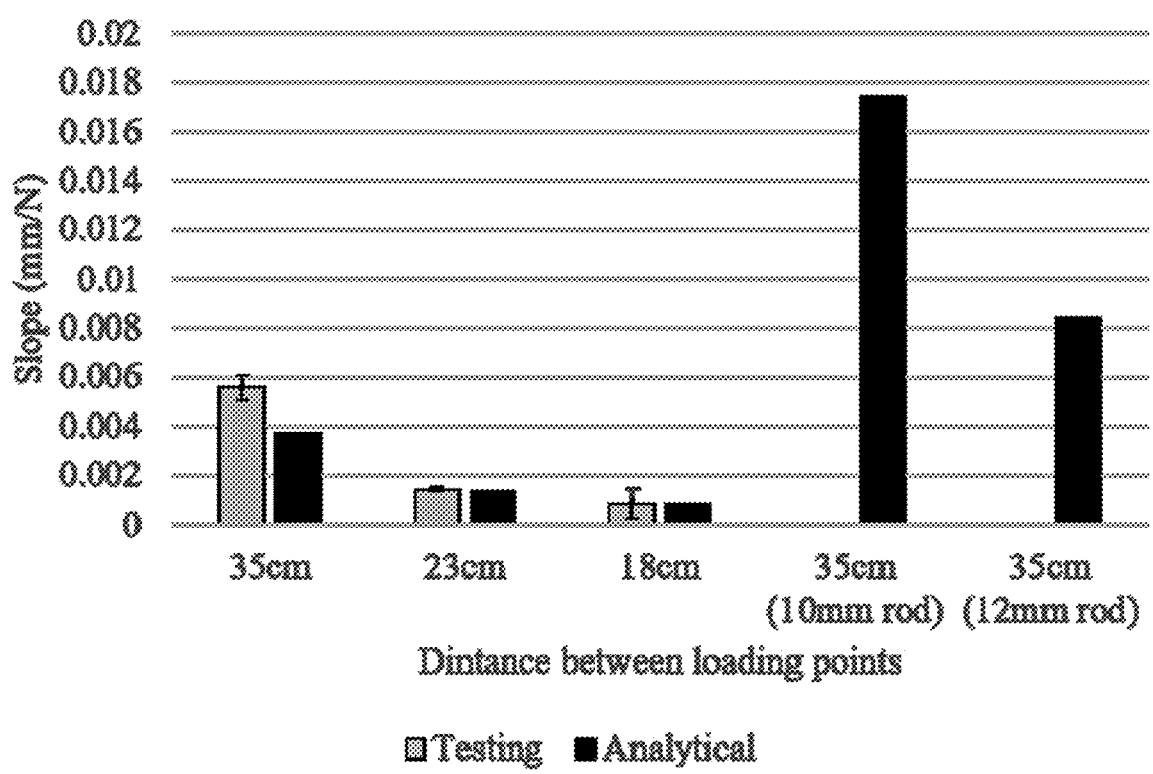
FIG. 13 illustrates sloped (mean and standard deviation) of the corrected displacement versus the load curves for the different loading point distances and for intramedullary rods representing an unhealed fracture.

Analytical solutions were also calculated for titanium rod of 10 mm and 12 mm diameters representing an unhealed (post-operational) fracture fixed with an intramedullary rod to compare the testing results on an intact tibia to the expected results for a fractured tibia. The experimental results showed relatively good agreement with the analytical solutions in FIG. 13. Discrepancies were likely due to the moment of inertia and elastic modulus properties assumed in the analytical solution, which can be highly variable. Large differences were seen between the analytical solutions for the intact tibia and the fractured tibia (intramedullary rod), indicating that differences in the bone deflection can be tracked over time as a fracture heals.

Testing II: Fracture Model of Sheep Tibia

Figure 14:
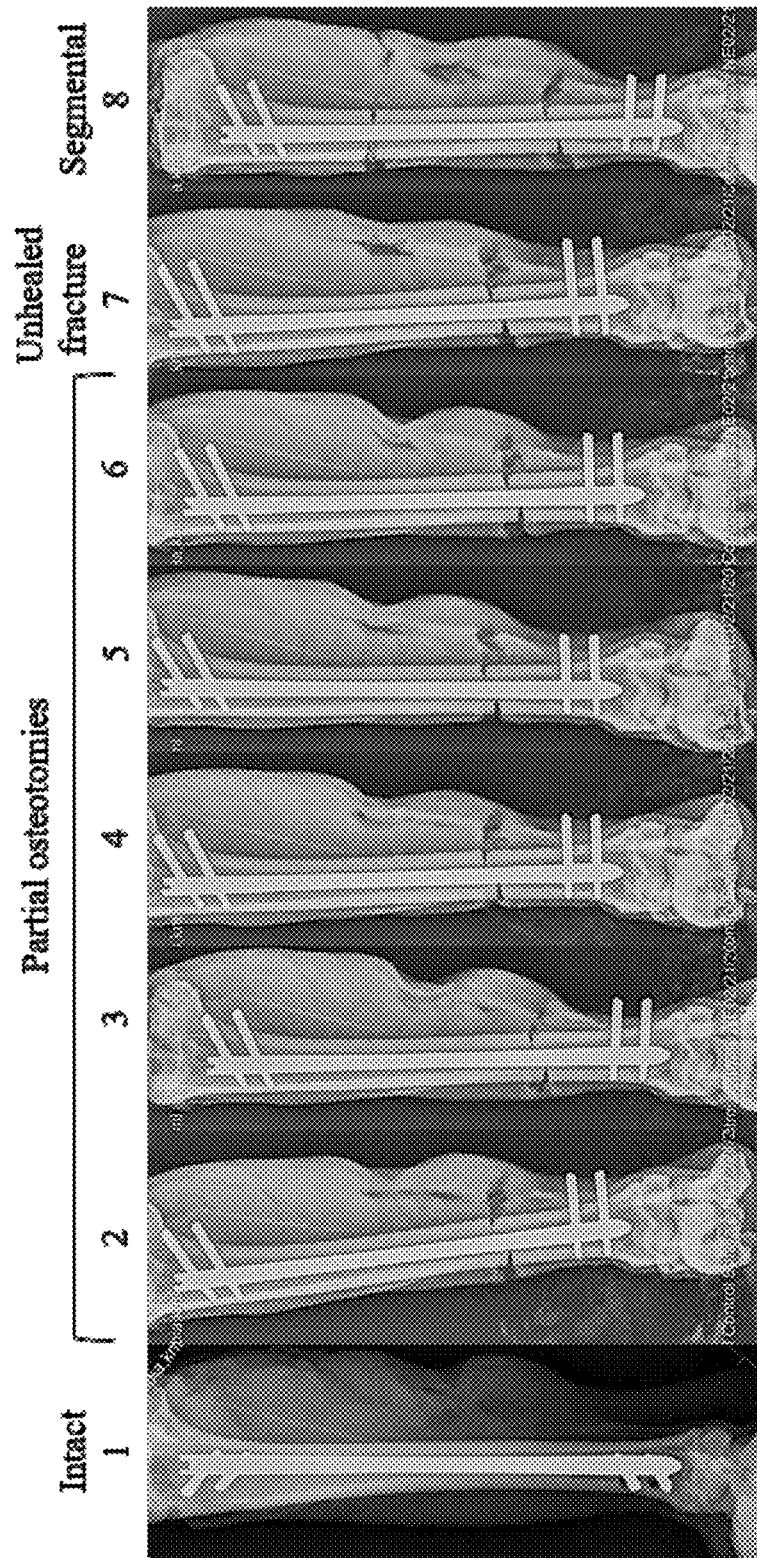
FIG. 14 illustrates radiographs of the eight testing conditions of a sheep tibia showing progressively destabilizing osteotomies.

The loading device was also tested on a cadaveric sheep tibia with an implanted intramedullary rod. The tibia was tested in eight conditions to simulate various stages of fracture healing. The first test was conducted with rod implanted in an intact bone. For tests two through six, progressively larger osteotomies were made to simulate a partially healed transverse diaphyseal fracture. For test seven, the osteotomy was extended entirely through the cross section of the bone to simulate an unhealed (post-operational) fracture. For test eight, a second complete osteotomy was made to simulate an unhealed segmental fracture. Radiographs were used to guide and confirm the osteotomies. See FIG. 14.

The loading device was configured in three-point bending deflection with the two upper loading members spaced 18 cm apart and a single lower loading member located centrally of the two upper loading members. Deflection data were collected from the antenna RFA and the displacement sensors S2 simultaneously. In each test, the bone was loaded from 30 N to 130 N for five cycles, and slopes were calculated from the corrected displacement sensor displacement versus load curves and the antenna resonant frequency versus the same load curves.

Figure 15A:
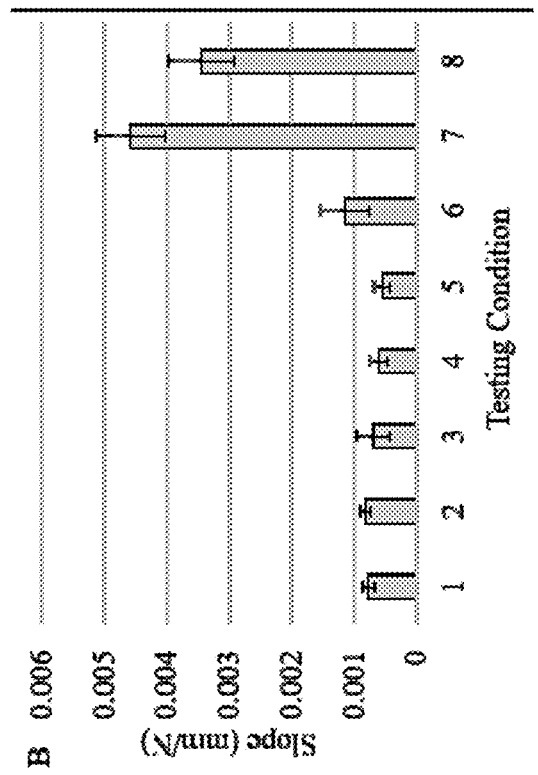
FIGS. 15A-15B illustrate slopes (mean and standard deviation) of the (A) antenna resonant frequency versus load curves, and (B) corrected linear sensor displacement versus the load curves.
Figure 15B:
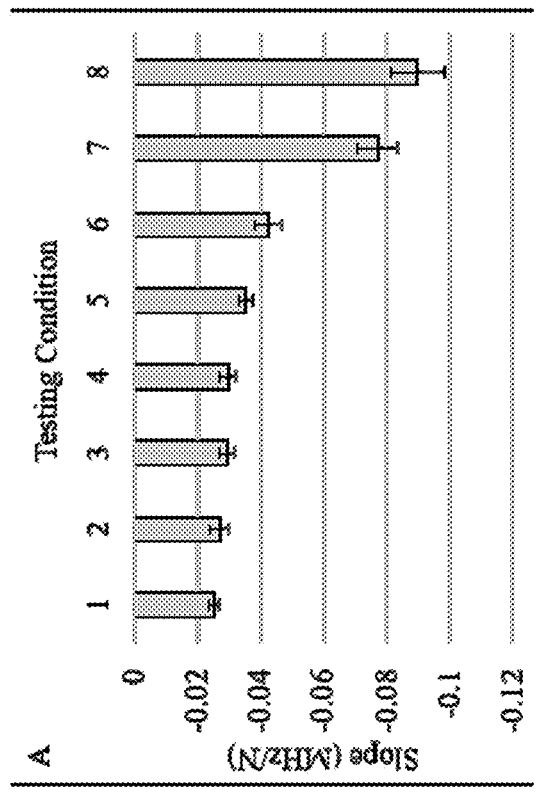

Referring to FIGS. 15A-15B, results using the antenna data showed that the resonant frequency shift increased relative to the applied load with each progressive osteotomy condition, indicating that the slope of the resonant frequency versus the load curve was able to track the decreased stiffness of the bone-rod construct as it was progressively destabilized. The displacement sensor data showed a similar trend to the antenna data, where the slope of the displacement versus the same load curve was higher in tests six through eight than tests one through five. But the slopes did not increase in each of the first five tests test like they did for the antenna data. Also, tests eight (segmental fracture) had a lower displacement/load slope than test seven (single fracture).

The greater variability in the displacement sensor data than the antenna data can be attributed to the displacement sensor measuring skin displacement, whereas the antenna RFA measures the combined deflection of the bone, soft tissue, and implanted metal rod, and is especially sensitive to metal materials. The large amount of soft tissue around the sheep tibia relative to typical human tibias may have contributed to the variability in the displacement sensor data. Also, the displacement/load slope was likely lower for test eight than test seven because the center displacement sensor S2 was located over the loose segment of the segmental fracture and did not displace as much, despite the more destabilized structure. But the antenna data did track the increased destabilization of test eight as an increased slope in the resonant frequency versus the load curve. Overall, these results indicate that the present device is capable of tracking changes in construct stiffness for a fractured bone fixed with orthopedic hardware, especially using the antenna deflection measurement method.

In short, the above tests showed that the using both sensor types can monitor fracture healing progress over time.

Each antenna disclosed in the previously mentioned U.S. Pat. Nos. 10,674,954 and 10,641,664 is directed to monitoring for deflection at a single region. Multiple antennae, including antenna designs described in these patents, however, can also be configured and implemented to detect the SM deflection at multiple locations using a single network analyzer or spectrum analyzer by connecting multiple antennae to different ports thereof and communicating with the antennae in a specified order sequence. See FIGS. 17C-17E. Although a single network analyzer can be used to measure deflection/displacement at a single region at a time, a measurement from each antenna would not occur concurrently. Moreover, the frequency at which measurements can be obtained from all antennae could limit this method's applicability in instances where large temporal resolution is necessary.

Figure 16:
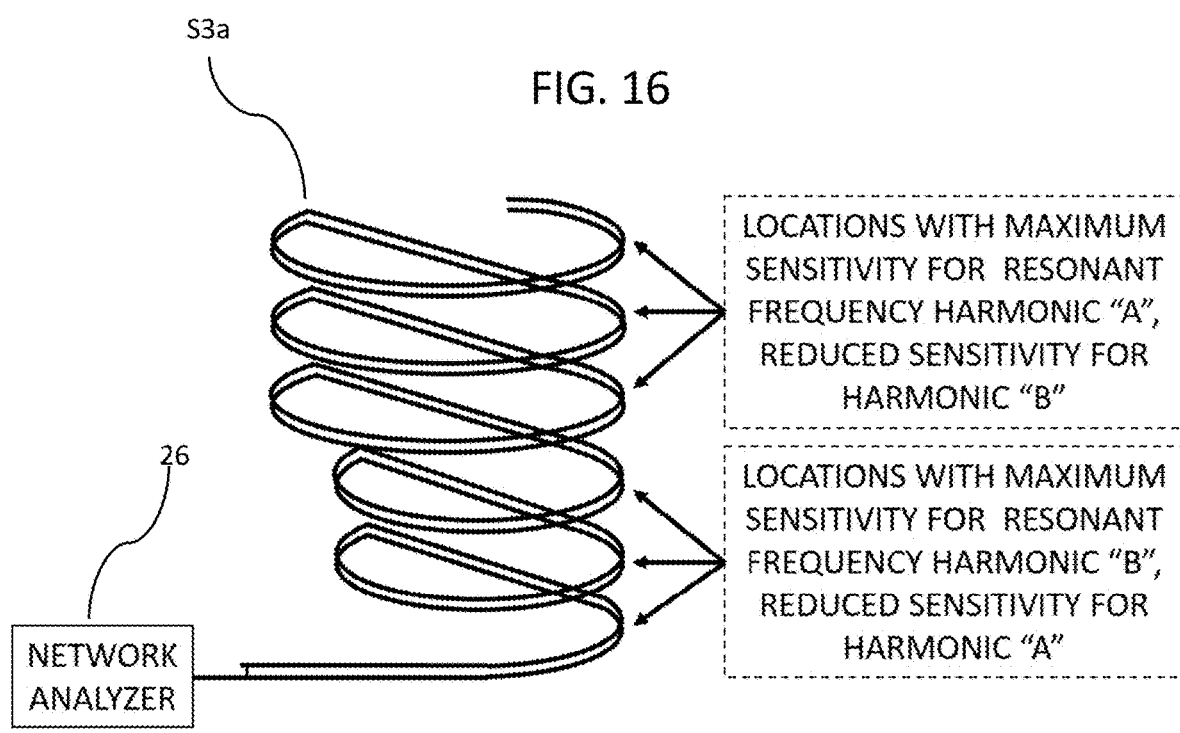
FIG. 16 is a schematic illustration of an antenna for detecting a SM deflection in multiple discrete locations.
Figure 20:
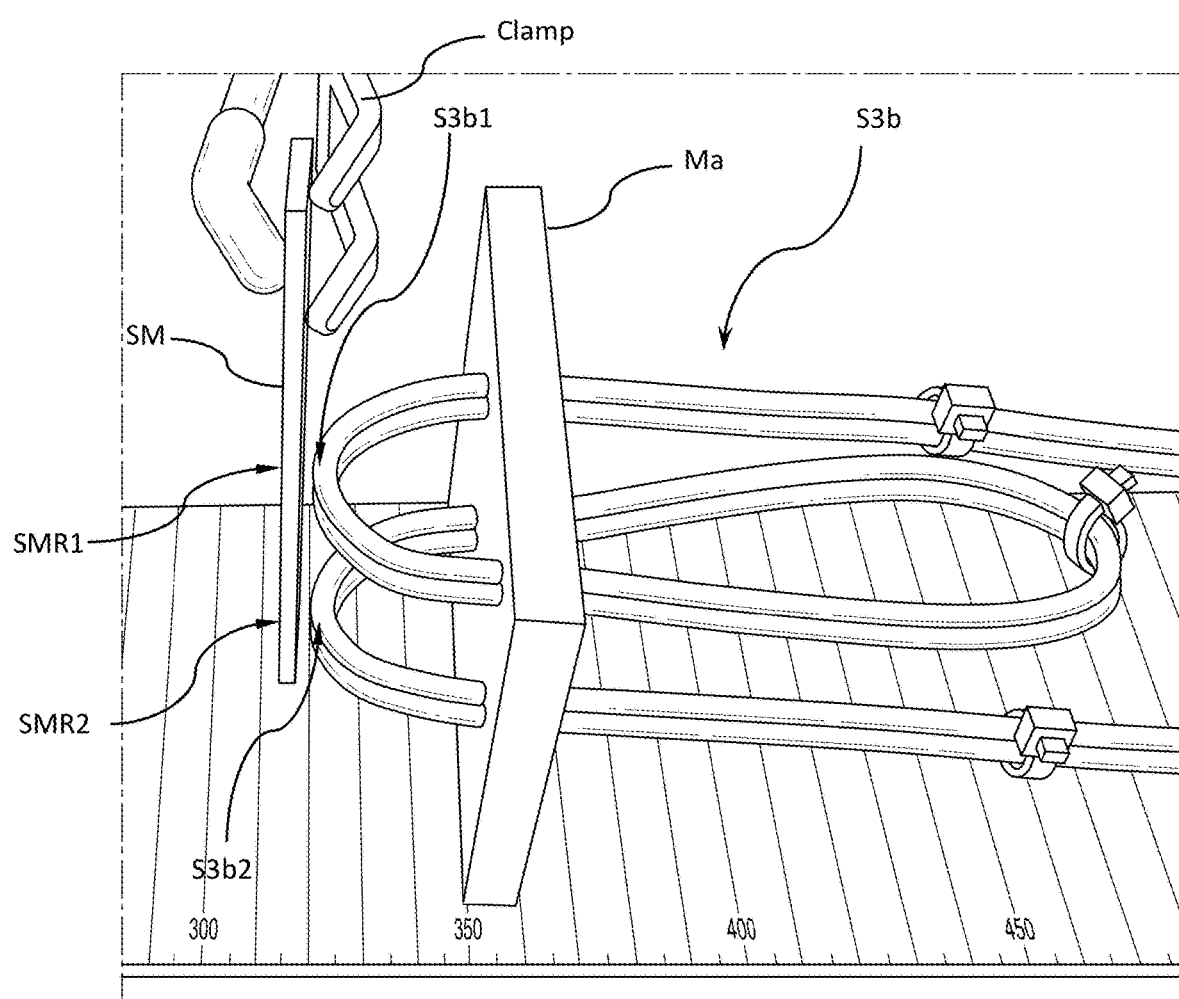
FIG. 20 illustrates an embodiment of an antenna that can be used to detect a SM deflection at two locations.

FIG. 16 schematically illustrates an embodiment of an antenna S3a that can concurrently detect deflections of the SM in multiple discrete regions of the SM by configuring different regions to output unique signature signals at different harmonic numbers. FIG. 20 illustrates a specific embodiment of an antenna S3b that is configured to detect the SM deflections at two regions, similar to the embodiment of FIG. 16. In FIG. 20, the SM is disposed confronting closely to the antenna S3b for illustration purposes only.

FIGS. 17A-17B illustrate another antenna S3c that is configured to detect the SM deflections at three regions. In these embodiments, by configuring the first-third coil regions S3c1, S3c2, S3c3 confronting the SM (first-third predetermined regions) uniquely to provide unique signature signals at those regions, a single antenna can be used to concurrently detect deflections at different regions of the SM. Configuring a single antenna to have unique signal signature regions that can be distinguished among the multiple regions being concurrently monitored is highly beneficial since only a single network analyzer would be needed, as opposed to requiring use of multiple network analyzers or spectrum analyzers and/or the use of multiple ports on a network analyzer or spectrum analyzer.

FIG. 17C illustrates an antenna configuration that uses a plurality of antennae connectable to a single network analyzer with the corresponding number of ports (one for each antenna) or a plurality of network analyzers, in a state where no load is applied to the SM. FIGS. 17D-17E illustrate a state where the antennae configuration of FIG. 17C is applied with a load. That is, the embodiments of FIGS. 17D-17E use the same antenna configuration of FIG. 17C. But in the embodiment of FIG. 17E, each of the three antennae is connected to its own network analyzer (which merely needs a single port) 26, while the embodiment of FIG. 17D uses a single network analyzer 26 with at least three ports each connected one of the three antennae.

Performing diagnostic antenna measurements concurrently at multiple spatial locations is beneficial. While the embodiment of FIGS. 17A-17B can measure deflections at multiple locations via a single antenna, FIGS. 17C-17E illustrate another antenna configurations that can concurrently detect SM deflections at multiple regions using multiple discrete antennae each of which can be configured according to the embodiments of the antennae S3, S3a, or S3b. In particular, FIGS. 17C-17E illustrate three antennae that can be independently configured to provide unique signature signals associated with respective three region where each antenna is located. Instead of the first-third coil regions S3c1, S3c2, S3c3 confronting the SM (first-third predetermined regions) uniquely to provide unique signature signals at those regions in, in the embodiments of FIGS. 17C-17E, three discrete antennae can replace the first-third coil regions S3c1, S3c2, S3c3, to be used to concurrently detect deflections at the three corresponding regions of the SM. Accordingly, each of the three antennae can have unique signal signature regions that can be distinguished among the multiple regions being concurrently monitored.

The measurement can also be achieved using a combination of the aforementioned techniques in these embodiments. Moreover, although measurements at each antenna location can be performed concurrently, they can be sequentially measured one after another. The number of measurement locations is not limited, and can be increased (or decreased) by adding additional (or subtracting) antennae.

One beneficial application occurs in orthopaedics where a fixation plate is used to stabilize fractured bone. The fixation plate and fractured bone act as a composite SM. The antenna S3c can be disposed confronting the SM at a fixed reference distance using a support structure, which can be an antenna housing or frame Ma in proximity to the SM. Here, the first coil region S3c1 is disposed at a distance $\delta_{A1}$, the second coil region S3c2 at $\delta_{B1}$, and the third coil region S3c3 at $\delta_{C1}$ at rest (when no load is applied to the SM). These distances $\delta_{A1}$, $\delta_{B1}$, $\delta_{C1}$ all can be set the same or differently to produce unique signature signals at each respective region.

The SM can be loaded in tension, compression, or bending using, for example, by a mechanical force, patient body weight, muscular contraction, pneumatic actuation, or hydraulic force. Those skilled in the art would understand that various loading can be used to produce tension, compression, or bending in the SM. The loading on the bone-fixation plate SM causes the SM to displace relative to the antenna, which is maintained in a fixed position relative to the SM at rest. The load on SM causes the SM to deflect, namely moving the initial distances $\delta_{A1}$, $\delta_{B1}$, $\delta_{C1}$ to $\delta_{A2}$, $\delta_{B2}$, $\delta_{C2}$ at predetermined points of the SM. The deflection is detected as a shift in the antenna's resonant frequency. Repeating this measurement throughout the collection period corresponding to the post-operative healing period enables quantification of temporal changes to the stiffness of the SM, and thus provides insight to the quality of bone healing.

Figure 18A:
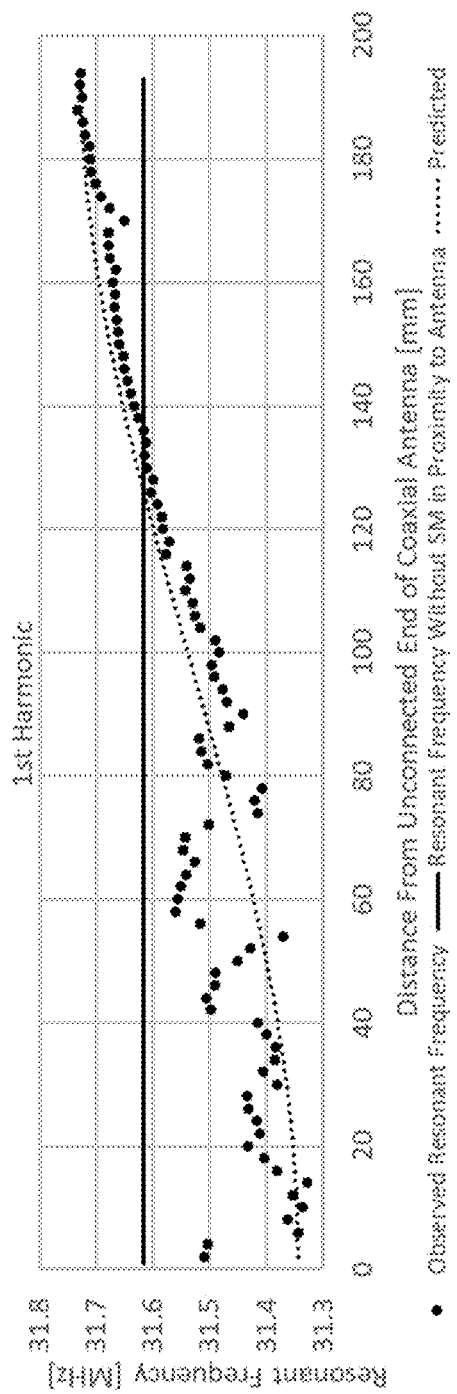
FIGS. 18A-18C illustrate, based on the embodiment of FIGS. 17A-17B, plots of the experimentally observed relationship between the antenna sensitivity to the presence of a structural member (SM) at different locations on the antenna at the first, second, and fifth harmonics, respectively.
Figure 18B:
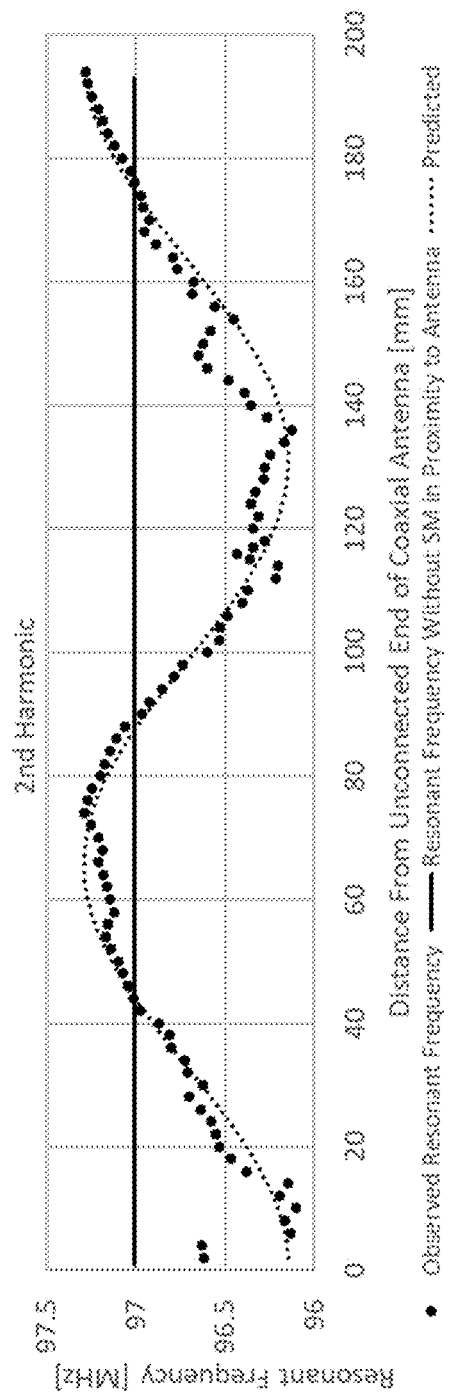
Figure 18C:
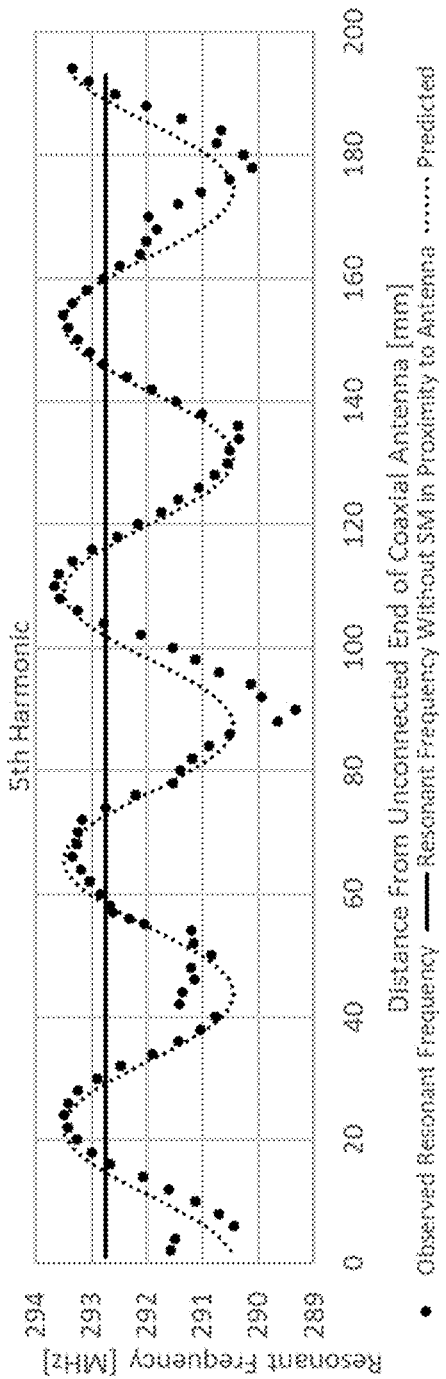
Figure 19:
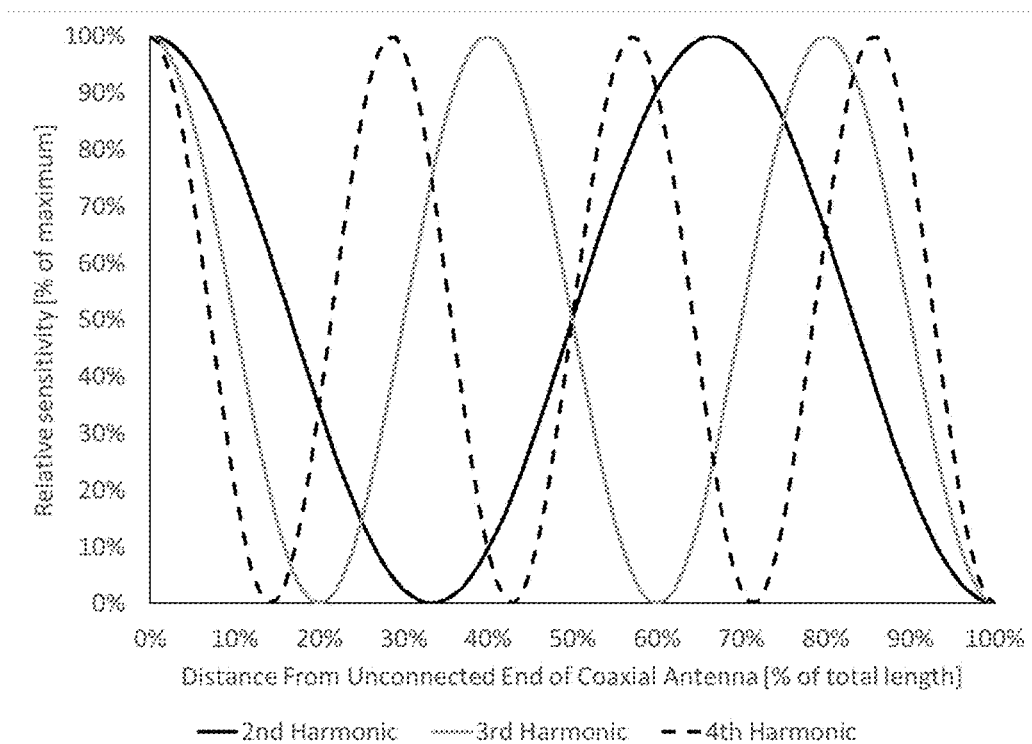
FIG. 19 illustrate plots representing the relative sensitivity to a SM deflection based upon antenna location and resonant frequency harmonic numbers.

FIGS. 18A-18C reveal data from the antenna S3c of FIGS. 17A-17B that a movement of the SM at some locations along the antenna can cause large changes to the resonant frequency at certain locations, while simultaneously eliciting little to no change when measuring at a different resonant frequency. An antenna that uses two parallel coaxial cables can detect deflection of an adjacent structure at multiple points. Specifically, selective antenna coiling configuration can align regions of maximum and minimum sensitivity to deflection at the respective regions to allow monitoring at multiple discrete regions.

The present monitoring system can determine the relative displacement of the SM, which can include beams, rods, or orthopaedic hardware. A source connected to the antenna, such as a network analyzer 26, generates an electromagnetic field emitted by the antenna. The electromagnetic field in a predetermined radio frequency spectrum, such as 10 Mhz to 4 GHz, with the preferred range being 40 Mhz to 900 MHz for biomedical applications, is emitted based on the antenna design. The antenna receives signals from the electromagnetic field, and thus can detect changes to the pattern of the electromagnetic field resulting from changes in the distance between the antenna and the SM and/or a deflection of the SM. Thus, shifts in the coupling between the SM and antenna during mechanical loading of the SM are indicative of deflection or deformation of the SM.

Analysis of the electrical signal output from the antenna via one of the pair of the coaxial cables characterize the electromagnetic coupling between the antenna and the SM. Such electrical signals include, but are not limited to, resonant frequencies, impedance, and the response magnitude of the S parameter. The electrical signal data are collected over a collection period so that temporal changes to the antenna-SM coupling may be quantified. Thus, repeated measurements during the collection period quantify temporal changes in the SM deflection due to a given mechanical loading.

Stiffness represents the resistance of the SM to deflection resulting from a given force. For example, increasing the stiffness of the SM decreases its deflection for any given load. Therefore, use of the monitoring system to quantify the SM deflection during mechanical loading allows for a relative quantification of the SM's stiffness. Performing this measurement over a collection period allows for measurement of temporal changes to the SM's stiffness.

As previously mentioned, the antenna can be a dipole antenna where two poles of the antenna are utilized. The pair of poles can be parallel to each other. Each pole may be a coaxial cable. The grounds of each cable are connected together and one of the coaxial cables is connected to a network analyzer port. The network analyzer provides power and measures the returned power at that port. The ratio of these two values is the "return loss", also known as the S11 parameter. The antenna's resonant frequencies occur where the S11 parameter reaches local minima.

The resonant frequency changes based upon the distance between the antenna and SM. For this dipole antenna, there are multiple resonant frequencies that occur harmonically based upon the coaxial cable length according to the following equation:

$$f(H) = \frac{H * c}{2 * L_{max}},$$

where f(H) is the resonant frequency for harmonic H, c is the speed of light in a vacuum, and $L_{max}$ is the total length of the coaxial cable. This approximate relationship can be used to select the coaxial cable length and harmonics to produce measurable resonant frequencies in specified frequency ranges, such as those set by the Medical Device Radiocommunication Service.

The antenna cables are coiled and the SM can be interrogated from the side of the coiled cables. Certain locations along the length of the coaxial cable have the greatest shift in the resonant frequency for a given change in antenna-SM separation. Thus, these locations feature the greatest sensitivity to the SM deflection. The quantity of these locations is equal to the resonant frequency harmonic number being measured. These locations of greatest sensitivity can be calculated using the equation:

$$L_{sensitive}(i) \xrightarrow{for\ i=1\ ...\ H} \frac{2(i-1)}{2H-1} * L_{max},$$

where i is the maximum sensitivity point number, $L_{sensitive}(i)$ is the distance of the maximum sensitivity point from the unconnected end of the coaxial cable, H is the resonant frequency harmonic number, and $L_{max}$ again is the total length of the coaxial cable. The coiled shape of the antenna increases the signal strength by aligning multiple of these locations of maximum sensitivity. Although the signal strength can be further increased by increasing the spacing between coils or measuring at higher harmonics, they also increase data noise levels.

Referring to FIG. 20, which illustrates the antenna S3b that detects a SM deflection at two locations, the relationship between the location along the antenna and the resultant sensitivity to SM deflection is the harmonics. Specifically, a first (upper) region SMR1 of the SM and a second (lower) region SMR2 of the SM are spaced vertically from each other. The illustrated distance scale 300-450 is in mm. A Clamp holds the SM at a desired fixed distance from the antenna (schematically shown spaced at about 2-3 mm from the first coil region S3b1 and S3b2, respectively, according to the scale).

There are equal numbers of locations with the maximum sensitivity or minimum sensitivity for a given resonant frequency harmonic number ($1^{st}$, $2^{nd}$, $3^{rd}$, $4^{th}$, $5^{th}$, etc.). The antenna thus can be uniquely configured at each region of the multiple regions to be monitored, namely coiling differently at the multiple discrete regions from each other to form each region that is highly sensitive at some harmonic numbers, while simultaneously being minimally sensitive within the same region at other harmonic numbers. Such arrangement of the antenna allows for a single antenna to discretely measure SM deflection at multiple spatial locations by simultaneously interrogating frequency bandwidths featuring multiple resonant frequency harmonics with a single network analyzer port.

FIG. 21 Illustrates the radio frequency spectrum for the antenna S3b illustrated in FIG. 20 that is configured to perform simultaneous measurements at two locations. The resonant radio frequencies of each harmonic shift independently when a SM is displaced in their individual vicinities. The measurement was taken from one (upper) location S3b1 located 20% along the total length of the cable from the free end (see FIG. 4), for the third harmonic, and another (lower) location S3b2 located at 34% along the total length of the antenna from the free end, for the fifth harmonic. This figure shows that the two locations each can have a unique signal signature at different frequency harmonics.

Figure 22A:
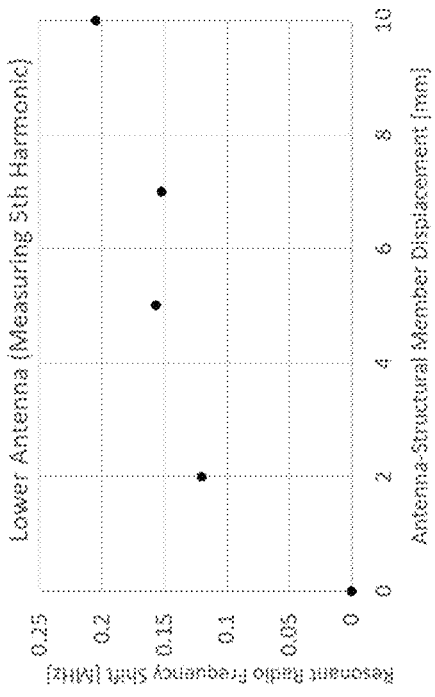
FIGS. 22A-22B illustrate plots showing the amount resonant radio frequency shift due to the displacement of a stainless steel SM, from where a discrete location of the antenna making contact to 10 mm displacement therefrom, at two spaced antenna locations corresponding to two positions of the SM to be monitored using the third and fifth harmonic frequencies, to demonstrate that the deflection of the SM corresponding to one antenna location using one harmonic frequency associated therewith results in a minimal shift to the resonant radio frequency at the harmonic associated with the other antenna location.
Figure 22B:
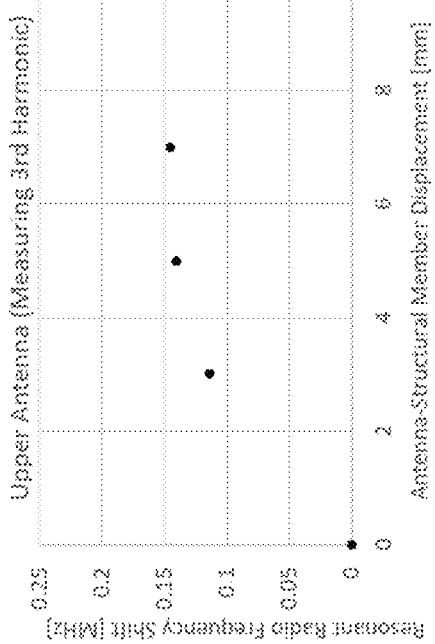

FIGS. 22A-22B Illustrate the quantity of resonant radio frequency shift due to the displacement of a stainless steel SM from contacting a discrete location of the antenna (i.e., the lower or upper location S3b1, S3b2) to 10 mm displacement. Measurements were obtained using the antenna illustrated in FIG. 20, which is configured to measure at two locations using the third and fifth harmonic frequencies. The SM was moved relative to the antenna locations S3b1, S3b2 and held using the clamp. Deflection of the SM at one antenna location (S3b1 or S3b2) results in minimal shift to the resonant radio frequency at the harmonic associated with the other antenna location (S3b2 or S3b1).

Although the present development has been described in terms of deflecting the SM relative to the antenna, the antenna can be driven in relation to the SM instead, such as using lead screw, pulley system, pneumatic actuator, hydraulic actuator, etc. Implementing a mechanism to displace the antenna relative to the SM allows a single antenna and network analyzer or spectrum analyzer to measure the deflection/displacement of the SM at multiple locations simultaneously.

Given the present disclosure, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A method of monitoring changes in a structural member (SM) at multiple locations as the SM undergoes a displacement as a load is applied to the SM, the method comprising:
    an antennae providing step of providing a plurality of discrete antennae each with a plurality of coils, each of the plurality antennae including:
        a first antenna with a first coil region configured to provide a maximum sensitivity to a first resonant frequency harmonic number within a predetermined radio frequency spectrum; and
        a second antenna with a second coil region configured to provide a maximum sensitivity to a second resonant frequency harmonic number, which is different from the first resonant frequency harmonic number, within the predetermined radio frequency spectrum;
    an antennae disposing step of disposing the first coil region confronting a first predetermined region of the SM to be monitored at a first distance from the SM and the second coil region disposed confronting a second predetermined region of the SM to be monitored, which is different from the first predetermined region, at a second distance from the SM;
    an inducing step of inducing, by applying a first electrical signal to the plurality of antennae, a magnetic or electromagnetic field in the SM and create a coupling of the magnetic or electromagnetic field between each of the plurality of antennae and the SM, wherein characteristics of the magnetic or electromagnetic field coupling between:
        the first antenna and the SM are associated with a distance between the first predetermined region of the SM and the first coil region; and the second antenna and the SM are associated with a distance between the second predetermined region of the SM and the second coil region; and an outputting step of outputting, by each of the plurality of antennae, a second electrical signal representing the characteristics of the magnetic or electromagnetic field coupling between the respective antenna and the SM, wherein the second electrical signals from the first and second antennae contain information for determining respective deflections at the first and second predetermined regions of the SM.

2. The method according to claim 1, further comprising a first determining step of determining, based on the obtained second electrical signals from the first and second antennae, determining the respective deflections at the first and second predetermined regions of the SM.

3. The method according to claim 2, further comprising a repeating step of repeating the inducing step, the outputting step, and the first determining step at a predetermined interval for an evaluation period.

4. The method according to claim 3, further comprising a second determining step of determining a shift in characteristics of the magnetic or electromagnetic field coupling between each of the first and second antennae and the SM over the evaluation period.

5. The method according to claim 4, further comprising a third determining step of determining a temporal change in relative displacement of the SM at the first and second predetermined regions of the SM over the evaluation period based on the shift determined in the second determining step.

6. The method according to claim 5, wherein the temporal change in relative displacement of the SM at the first and second predetermined regions over the evaluation period is represented as a slope of resonant frequency/load at the respective first and second resonant frequency harmonic numbers within the predetermined radio frequency spectrum.

7. The method according to claim 1, wherein:
the SM is mountable to a target object to be monitored, the SM undergoing the displacement as the target structural object undergoes a displacement or deformation, and
the first and second distances are equal to each other or different from each other.

8. The method according to claim 2, further comprising:
a loading step of applying a predetermined load to the SM,
wherein the first determining step analyzes the determined characteristics in relation to the predetermined load applied to the SM in the loading step to determine the deflections at the first and second predetermined regions of the SM.

9. The method according to claim 1, wherein the outputting step outputs the second electrical signal from each of the plurality of antennae to at least one network analyzer provided with a plurality of ports.

10. The method according to claim 1, wherein the outputting step outputs the second electrical signal from each of the plurality of antennae to each of a plurality of network analyzers.

11. An apparatus for measuring deflections in a structural member (SM) at multiple locations as the SM undergoes a displacement as a load is applied to the SM, the apparatus comprising:
a plurality of discrete antennae each with a plurality of coils, each of the plurality of antennae including:

a first antenna with a first coil region configured to provide a maximum sensitivity to a first resonant frequency harmonic number within a predetermined radio frequency spectrum; and
a second antenna with a second coil region configured to provide a maximum sensitivity to a second resonant frequency harmonic number, which is different from the first resonant frequency harmonic number, within the predetermined radio frequency spectrum; and
a support structure that maintains the first coil region disposed confronting a first predetermined region of the SM to be measured at a first distance from the SM and the second coil region disposed confronting a second predetermined region of the SM to be measured, which is different from the first predetermined region, at a second distance from the SM,
wherein each of the plurality of antennae is configured to:
induce, upon applying a first electrical signal thereto, a magnetic or electromagnetic field in the SM and create a coupling of the magnetic or electromagnetic field between the respective antenna and the SM, wherein characteristics of the magnetic or electromagnetic field coupling between:
the first antenna and the SM are associated with a distance between the first predetermined region of the SM and the first coil region; and
the second antenna and the SM are associated with a distance between the second predetermined region of the SM and the second coil region; and
output a second electrical signal representing the characteristics of the magnetic or electromagnetic field coupling between the respective antenna and the SM, wherein the second electrical signals from the first and second antenna contains information for determining respective deflections at the first and second predetermined regions of the SM.

12. The apparatus according to claim 1, wherein:
each of the plurality of antennae is a dipole antenna that operates as a displacement sensor and comprises a first coaxial cable including a first end and a second end,
the first end of the first coaxial cable receives the first electrical signal, and
the first end of the first coaxial cable outputs the second electrical signal.

13. The apparatus according to claim 12, wherein:
the dipole antenna further includes a second coaxial cable including a third end and a fourth end,
the first coaxial cable includes a first shield and a first center conductor,
the second coaxial cable includes a second shield and a second center conductor,
the first and second shields are electrically connected,
the first center conductor at the second end and the second center conductor at the third and fourth ends terminate without any connection,
a predetermined length of the first center conductor is exposed at the second end and a predetermined length of the second center conductor is exposed at the fourth end, and
the support structure maintains the exposed first and second conductors substantially parallel to each other.

14. The apparatus according to claim 12, wherein:
the plurality of coils include a plurality of first coils of the first coaxial cable and a plurality of second coils of the second coaxial cable, and the support structure maintains the plurality of first coils in a coiled configuration between the first end and the second end and the plurality of second coils in a coiled configuration between the third end and the fourth end.

15. A monitoring system for monitoring changes in a structural member (SM) at multiple locations as the SM undergoes a displacement as a load is applied to the SM, the system comprising:
a plurality of discrete antennae each with a plurality of coils, each of the plurality of antennae including:
a first antenna with a first coil region configured to provide a maximum sensitivity to a first resonant frequency harmonic number within a predetermined radio frequency spectrum; and
a second antenna with a second coil region spaced from the first coil region and configured to provide a maximum sensitivity to a second resonant frequency harmonic number, which is different from the first resonant frequency harmonic number, within the predetermined radio frequency spectrum; and
a support structure that maintains the first coil region disposed confronting a first predetermined region of the SM to be monitored at a first distance from the SM and the second coil region disposed confronting a second predetermined region of the SM to be monitored, which is different from the first predetermined region, at a second distance from the SM; and
a load applying mechanism configured to apply a load to the SM,
wherein each of the plurality of antennae is configured to:
induce, upon applying a first electrical signal thereto, a magnetic or electromagnetic field in the SM and create a coupling of the magnetic or electromagnetic field between the respective antenna and the SM, wherein characteristics of the magnetic or electromagnetic field coupling between:
the first antenna and the SM are associated with a distance between the first predetermined region of the SM and the first coil region; and
the second antenna and the SM are associated with a distance between the second predetermined region of the SM and the second coil region; and
output a second electrical signal representing the characteristics of the magnetic or electromagnetic field coupling between the respective antenna and the SM, each time the load applying mechanism applies the load to the SM,
wherein the second electrical signals from the first and second antennae contains information for determining respective deflections at the first and second predetermined regions of the SM.

16. The monitoring system according to claim 15, further comprising:
a controller including a memory storing instructions and a processor configured to implement instructions stored in the memory and execute a plurality of tasks;
at least one hardware interface configured to receive the second electrical signal from each of the plurality of antennae, and convert each second signal that is readable by the controller,
wherein the plurality of tasks include:
a first determining task that, based on the converted second electrical signals of the first and second antennae from the at least one hardware interface, determines the characteristics of the magnetic or electromagnetic field coupling between the first and second antennae and the SM respectively at the first and second predetermined regions of the SM, and determines the deflections at the first and second predetermined regions of the SM, respectively; and
a storing task that stores the determined deflections in the storage device each time the load applying mechanism applies a load to the SM.

17. The monitoring system according to claim 16, wherein the at least one hardware interface is a network analyzer provided with a plurality of ports or a plurality of network analyzers, each configured to:
output the first electrical signal to each of the plurality of antennae;
receive the second electrical signal from each of the plurality of antennae; and
also determine the characteristics of the magnetic or electromagnetic field coupling between each of the plurality of antennae and the SM based on the received respective second electrical signal.

18. The monitoring system according to claim 16, wherein:
the first determining task determines the deflections at the first and second predetermined regions of the SM at a predetermined interval for an evaluation period,
the storing task stores the determined deflections at the predetermined interval for the evaluation period.

19. The monitoring system according to claim 18, wherein the plurality of tasks include a second determining task that determines a shift in characteristics of the magnetic or electromagnetic field coupling between each of the plurality of antennae and the SM over the evaluation period.

20. The monitoring system according to claim 19, wherein the plurality of tasks include a third determining task that determines a temporal change in relative displacement of the SM at each of the first and second predetermined regions of the SM over the evaluation period based on the shift determined in the second determining task.

21. The monitoring system according to claim 20, wherein the temporal change in relative displacement of the SM at the first and second predetermined regions over the evaluation period is represented as a slope of resonant frequency/load at the respective first and second resonant frequency harmonic numbers within the predetermined radio frequency spectrum.

22. The monitoring system according to claim 15, wherein:
the load applying mechanism applies a predetermined load to the SM,
the first determining task analyzes the determined characteristics in relation to the predetermined load applied to the SM by the load applying mechanism to determine the deflections at each of the first and second predetermined regions of the SM.

23. The monitoring system according to claim 16, wherein:
each of the plurality of antennae is a dipole antenna that operates as a displacement sensor and comprises a first coaxial cable including a first end and a second end, and
the first end of the first coaxial cable connects to the at least one hardware interface to output the first electrical signal to the dipole antenna, and receive the second electrical signal from the antenna.

24. The monitoring system according to claim 23, wherein:
the dipole antenna further includes a second coaxial cable including a third end and a fourth end, the first coaxial cable includes a first shield and a first center conductor, the second coaxial cable includes a second shield and a second center conductor, the first and second shields are electrically connected, the first center conductor at the second end and the second center conductor at the third and fourth ends terminate without any connection, a predetermined length of the first center conductor is exposed at the second end and a predetermined length of the second center conductor is exposed at the fourth end, and the support structure maintains the exposed first and second conductors substantially parallel to each other.

25. The monitoring system according to claim 24, wherein:

the plurality of coils include a plurality of first coils of the first coaxial cable and a plurality of second coils of the second coaxial cable, and the support structure maintains the plurality of first coils in a coiled configuration between the first end and the second end and the plurality of second coils in a coiled configuration between the third end and the fourth end.

26. The monitoring system according to claim 25, wherein:

the first coil region includes at least one coil of each of the plurality of first coils and the plurality of second coils of the first antenna, and the second coil region includes at least one coil of each of the plurality of first coils and the plurality of second coils of the second antenna.

* * * * *

UNITED STATES PATENT AND TRADEMARK OFFICE
CERTIFICATE OF CORRECTION

| | |
|---|---|
| PATENT NO. | : 11,402,193 B2 |
| APPLICATION NO. | : 17/146112 |
| DATED | : August 2, 2022 |
| INVENTOR(S) | : Jakob Wolynski et al. |

It is certified that error appears in the above-identified patent and that said Letters Patent is hereby corrected as shown below:

In the Specification

In Column 1, Line 9, before the "BACKGROUND" section, please insert the following new paragraph:
--STATEMENT OF GOVERNMENT SUPPORT
This invention was made with government support under grant R01 AR069734 awarded by the National Institutes of Health. The government has certain rights in the invention.--

Signed and Sealed this
Thirteenth Day of February, 2024

Katherine Kelly Vidal
*Director of the United States Patent and Trademark Office*